US009213677B2

(12) United States Patent
Konig et al.

(10) Patent No.: US 9,213,677 B2
(45) Date of Patent: Dec. 15, 2015

(54) RECONFIGURABLE PROCESSOR ARCHITECTURE

(75) Inventors: Ralf Konig, Weingarten (DE); Timo Stripf, Karlsruhe (DE); Jurgen Becker, Jockgrimm (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 763 days.

(21) Appl. No.: 13/582,485

(22) PCT Filed: Feb. 28, 2011

(86) PCT No.: PCT/EP2011/052903
§ 371 (c)(1),
(2), (4) Date: Sep. 4, 2012

(87) PCT Pub. No.: WO2011/107424
PCT Pub. Date: Sep. 9, 2011

(65) Prior Publication Data
US 2012/0331268 A1 Dec. 27, 2012

(30) Foreign Application Priority Data

Mar. 4, 2010 (EP) ..................................... 10002221

(51) Int. Cl.
*G06F 15/00* (2006.01)
*G06F 15/76* (2006.01)
*G06F 15/78* (2006.01)
*G06F 15/80* (2006.01)

(52) U.S. Cl.
CPC ........ *G06F 15/7867* (2013.01); *G06F 15/8007* (2013.01)

(58) Field of Classification Search
CPC .............................. G06F 15/76; G06F 15/7867
See application file for complete search history.

(56) References Cited

U.S. PATENT DOCUMENTS

| 4,833,599 | A | 5/1989 | Colwell et al. |
| 5,890,008 | A | 3/1999 | Panwar et al. |
| 7,389,403 | B1 | 6/2008 | Alpert et al. |
| 7,613,900 | B2 | 11/2009 | Gonzalez et al. |
| 2006/0117164 | A1* | 6/2006 | Coxe et al. ........................ 712/15 |
| 2009/0013160 | A1* | 1/2009 | Burger et al. .................. 712/226 |
| 2009/0070552 | A1* | 3/2009 | Kanstein et al. ................ 712/29 |
| 2009/0146690 | A1* | 6/2009 | Vorbach et al. .................. 326/41 |

OTHER PUBLICATIONS

Pita, A, et al, "Sectored Renaming for Superscalar Microprocessors", Performance, Computing and Communications Conference, 1999 IEEE International, Scottsdale, Arizona, Feb. 10-12, 1999, pp. 59-64.

* cited by examiner

*Primary Examiner* — Hyun Nam
(74) *Attorney, Agent, or Firm* — Volpe and Koenig, P.C.

(57) ABSTRACT

A reconfigurable data processor architecture. The processor architecture includes: a first plurality of data processing elements, each having a respective synchronization unit, a data link structure adapted for dynamically interconnecting a number of the data processing elements, at least one configuration register, and at least one control unit in operative connection with the configuration register for controlling a contents thereof, wherein, based on the contents, the first plurality of data processing elements is adapted for temporarily constituting at runtime at least one group of one or more of said data processing elements from said first plurality of data processing elements dynamically via the data link structure. The synchronization units are adapted for synchronizing data processing by individual data processing elements within the group. The first plurality of data processing elements may be reconfigurably grouped and thus adapted to various data processing tasks at runtime. This increases data processing efficiency.

15 Claims, 8 Drawing Sheets

RECONFIGURABLE PROCESSOR ARCHITECTURE

BACKGROUND

The invention relates to a processor architecture, said processor architecture comprising a first plurality of data processing elements, which are interconnected in operative connection by means of a data link structure, and is particularly concerned with improving the use of resources in a multi-threaded VLIW (Very Long Instruction Words) instruction processor for variable word length.

In the present context, a processor designates an arbitrary information processing device, which is adapted to process one or more instruction sequences.

In the present context, a processor instance designates a virtual processor which processes an instruction sequence or thread. A processor instance is created by suitably configuring available hardware modules and may be deleted or destroyed by means of reconfiguration.

In the present context, a configuration designates a number of data bits, which is stored in a sequential logic system and which affects its behaviour.

In the present context, the term "reconfigurable" denotes that the configuration of a sequential logic system can be changed at runtime.

The invention may be of particular importance for so-called "embedded systems". An embedded system is a computer system designed to perform one or a few dedicated functions often with real-time computing constraints. It may also be referred to as a special-purpose computer or special-purpose processor (SPP). It is embedded as part of a complete device often including hardware and mechanical parts. By contrast, a general-purpose computer, such as a personal computer, or a general-purpose processor (GPP) is designed to be flexible and to meet a wide range of end-user needs. Embedded systems control many devices in common use today. The multiplicity of applications that may potentially be executed on next generation embedded systems will not only lead to a more diversified processing behaviour. Even more, their dynamic runtime characteristics will also lead to a hardly predicable behaviour which makes state-of-the-art embedded systems, composed of GPPs and SPPs, behave inefficiently as far as costs, performance, power and time-to-market constraints are concerned. This stimulates the need for a novel, innovative architecture that is able to efficiently cope with an increased diversified processing behaviour by dynamically adapting, at runtime, hardware resources in view of data-flow characteristics and processing type much more flexible than state-of-the art approaches.

Applications of different types or parts of said applications are executed with different efficiencies on different processors as far as, e.g., energy consumption, use of resources, and duration of execution are concerned. The above-mentioned GPPs perform well for a large variety of applications, e.g., X86 processors for desktop general-purpose computers. SPPs, on the other hand, are designed to perform well only with small number of highly specialized applications. The present invention is particularly aimed at reducing the gap between GPPs and SPPs in order to provide a processor architecture which can be flexibly employed to perform both general-purpose and special-purpose tasks with high efficiency.

The prior art on the technical field of increasing processor efficiency and flexibility comprises a technique known as parallel instruction execution. With this technique, two or more instructions or operations are executed simultaneously by means of parallel processing in order to increase processor performance.

U.S. Pat. No. 4,833,599 discloses an example of parallel instruction execution. In particular, said document discloses a processor which executes a plurality of instructions simultaneously by using VLIWs. Although the number of individual instructions, which may be comprised in a single VLIW instruction, can be as high as 20 or more, the length of the VLIW instruction words is fixed, thus greatly reducing the flexibility of use of the known processor.

Program code to be executed by a given processor may sometimes be split into smaller components, which are called threads. A thread is a sequence of instructions, the execution of which achieves a given task or result. For instance, in a video conferencing application the processor could be called for executing code for treating audio and video data. There could be separate code sequences, an execution of which is devised for separately treating said audio and said video data, respectively. Thus a first thread would comprise instructions for treating video data, and a second thread would comprise instructions for treating audio data. In other words, a thread is an independent program typically associated with a thread identifier, and during execution in a hardware multi-threaded environment, an architectural state of the processor core executing one thread may be maintained while instructions are being executed by another thread.

U.S. Pat. No. 5,890,008 discloses a system and a method for dynamically reconfigurating a processor between single-processor and selected multiple-processor configurations. Said document teaches a processor architecture which is devised to adapt the processor hardware in such a way as to support a plurality of applications executed in parallel on a single processor chip. The processor of U.S. Pat. No. 5,890,008 can be dynamically reconfigured so that it presents one or more virtual processor units or processor elements (so-called "strands"). Said document further describes various types of processor units, e.g., an instruction calling unit, an instruction renaming unit, an instruction scheduling unit, and an instruction execution unit, as well as further units. Said units may comprise pipeline stages, or may constitute a pipeline together. Further disclosed is an execution of instructions, which belong to different threads. To this end some of said units comprise memory locations for storing thread identifications in connection with said instructions from different threads. However, at least some execution resources are shared in a time-multiplexed manner between strands and are not exclusively available for one strand, e.g., by replication of the resources. Therefore, disadvantageously, the performance of one thread executed by a strand varies depending on the number of strands.

SUMMARY

It is the object of the present invention to provide a processor architecture of the above-defined type which is capable to adapt—at runtime—at least to the characteristics of data-flow, processing type, and available free resources, thus reducing the gap between general-purpose processors and special-purpose processors in order to provide a processor architecture which can be flexibly employed to perform both general-purpose and special-purpose tasks with high efficiency, particularly in embedded systems.

The object is achieved by the invention. Preferred further developments of said subject-matter are defined below and in the claims, the wording of which is herewith incorporated by reference in the present description in order to avoid unnecessary repetition of text.

According to the invention there is provided a processor architecture of the above-defined type, comprising: a first plurality of data processing elements, each of said first plurality of data processing elements comprising a respective synchronization unit, a data link structure adapted for dynamically interconnecting a number of data processing elements from said first plurality of data processing elements, at least one configuration register, and, preferably, at least one optional control unit in operative connection with said at least one configuration register for controlling, e.g. modifying the contents thereof, wherein, based on the contents of said configuration register, said first plurality of data processing elements is adapted for temporarily constituting at runtime at least one group of one or more of said data processing elements from said first plurality of data processing elements dynamically via said data link structure, wherein said synchronization units are adapted for synchronizing data processing by individual data processing elements within said group of data processing elements.

In this way, the present invention solves the above object by providing a respective synchronization unit, which can be used for synchronizing individual data processing elements, within each of said first plurality of data processing elements, which constitute a reconfigurable array of data processing elements or cores, so that they may be reconfigurably grouped and thus adapted to various data processing tasks at runtime. In this way, data processing efficiency may be greatly increased.

In a further development, the processor architecture in accordance with the present invention may optionally comprise said at least one control unit, which serves as an interface to a (superordinate) operating system and which may be adapted for controlling, e.g., modifying the contents of said at least one configuration register, thus affecting the dynamical synchronization of data processing elements. The control unit may be implemented in the form of a single, central control unit, or it may be implemented in the form of a plurality of distributed control units. The configuration register, too, may preferably but without limitation be realized in the form of a plurality of distributed configuration registers.

The synchronization units of individual data processing elements need not be realized in the form of a self-contained single unit, but may be implemented as distributed synchronization units, each comprising a plurality of distinct synchronization subunits, said subunits constituting the respective synchronization unit.

In this context, the synchronization units are adapted for controlling synchronized data exchange and/or data processing between at least two of said data processing elements via data link structures based on the contents of said configuration register, which may be modified by said optional control unit.

Alternatively or additionally, in order to achieve synchronization between data processing elements, at least for pairs of data processing elements the respective synchronization units may be adapted for delaying operation execution in a first data processing element until data required for said operation execution have been transmitted from a second data processing element via said respective synchronization units.

To achieve this in practice, in a further development of the proposed processor architecture, each data processing element may comprise at least one instruction pointer designating the next instruction to be executed, and the respective synchronization units may be adapted for synchronizing instruction pointers between two or more of said data processing elements.

In this context, the instruction pointer is a processor register that indicates where the application thread is in its instruction sequence. It holds either the address of the instruction being executed, or the address of the next instruction to be executed.

The data link structure may either be devised as a variable structure or as a static structure, provided that it can be used for dynamically interconnecting a number of said data processing elements, i.e., bringing them in mutually operative connection for working together on a given data processing task based on the contents of said configuration register and optionally under control of said control unit.

In this context, at least one of the said data processing elements may comprise at least one configuration update operation for modifying the said configuration register, thereby achieving additional system flexibility.

According to a further development, the processor architecture may further comprise a plurality of processor resource units, in particular instruction preprocessing units, which may perform the instruction decode step in known instruction pipelining, wherein, based on the contents of said configuration register, which may be modified by said optional control unit, the processor architecture may be adapted for temporarily constituting at runtime at least one processor mode instance of ISA-type from said group of data processing elements and from a number of said processor resource units, preferably at least some of said processor resource units being implemented in centralized fashion, in contrast to said processor resource units being located within individual data processing elements.

In this context, a particular Instruction Set Architecture (ISA)-type processor instance comprises of a specific runtime combination of processor resource units, hereinafter also referred to as "tiles", and data processing elements in order to be compatible with a required ISA. An ISA is—basically—the formal specification of reproducible behavioural patterns of a processor from the point of view of a programmer. It comprises the specification of a set of instructions and the binary code thereof as well as the specification of processor behaviour in the context of a give operation state or under occurrence of a particular event (interrupt, reset, . . . ). In this way, the processor architecture according to the present invention does not fixedly implement a processor for one specific ISA type only. It rather consists of a variety of different tiles (individually reconfigurable, i.e., dynamically connectable hardware modules) that can be dynamically combined with each other and/or with data processing elements to realize different ISAs and/or Kernels (low-level implementation of computationally intensive algorithms through reconfiguration of sequential logic) which constitutes a so far unmatched flexibility of the proposed architecture.

It is preferred that said processor resource units or tiles (e.g., instruction cache units, instruction fetch and split units, instruction pre-decode and control flow units, and instruction renaming units) be devised physically separate from the data processing elements in order to further enhance system efficiency and flexibility. However, according to an alternative further development of the invention, a number of said processor resource units may be comprised in individual data processing elements of said first plurality of data processing elements.

According to a further development of the proposed processor architecture, the latter may further comprise at least one instruction cache unit, as already mentioned above, wherein at least one of said data processing elements may be dynamically associated with said instruction cache unit by means the contents of said configuration register.

As already mentioned farther up, according to a further development of the proposed processor architecture, the latter may further comprise at least one split unit, which is adapted for distributing instructions comprised in said instruction cache unit in conformity with a processor instance of ISA-type to different data processing elements, if said instruction cache unit is associated with more than one data processing element.

As already mentioned farther up, in another further development of the proposed processor architecture, at least two of said processor resources units may comprise a register rename unit for renaming registers to avoid name dependencies between subsequent instructions executed by said data processing elements, said register rename units being in operative connection with respective renaming synchronization units for synchronizing said renamed registers by means of said renaming synchronization units. The aforementioned renaming synchronization units are distinct from the synchronization units comprised in the individual data processing elements and do preferably from part of a dedicated renaming processor resource unit, which will be explained below in connection with the appended drawings.

According to a further development of the proposed processor architecture, said processor mode instance of ISA-type may be chosen from a group comprising at least RISC and n-issue VLIW processor modes, wherein n is a positive integer value, which is equal to or less than a positive integer value m, m being the maximum possible number of total issues of processor instances presently achievable by the processor architecture.

In this way, the proposed processor architecture is adapted to support a reconfiguration of the instruction format: As stated farther up, a processor of a given (ISA-) type usually comprises a fixed format which is used for instruction encoding. One can distinguish between Reduced Instruction Set Computer (RISC) instruction format and VLIW instruction format. Basically, RISC encodes one operation per instruction, and VLIW may encode several operations per instruction for parallel execution. The above-identified further development provides a processor which is adapted to execute different instruction formats. This is equivalent to stating that an integer number of n operations can be reconfigured per instruction. A number of n=1 would be equivalent to a standard RISC processor, and n>1 would correspond to a so-called n-issue VLIW processor, as known to a person skilled in the art.

Depending on the particular value for n that is suitable for a given application in order to enhance system efficiency, only part of the available hardware resources of the processor system are needed. It is a particular advantage of the proposed processor architecture that the remaining free resources may be flexibly and dynamically employed for other tasks.

As already stated farther up, a known measure for enhancing performance of prior art processor systems resides in the use of a plurality of processors in a given system. In the context of desktop computers there are so-called multi-core processors, which consist of a plurality of processor cores and which are adapted to execute a like plurality of (application) threads, i.e., entire applications or a single application with multiple threads, in parallel.

In contrast to this approach, the proposed processor architecture or processor system may comprise a multitude of processor resource units, which may be dynamically combined to constitute a processor instance. Each of said processor instances executes a thread and may be devised to execute at least one instruction per time unit—depending on a respective type of processor instance. For to realize a processor instance based on the above-described instruction format reconfiguration technique, only the required minimum number of processor system resources is used for this purpose.

Accordingly, in a further development of the proposed processor architecture said configuration register may be adapted or modified by said control unit for temporarily constituting at runtime an instruction format for at least one predetermined application thread for execution on said processor architecture, whereby the number of data processing elements and/or the amount of processor resource units required for creating processor mode instances for execution of said application thread and/or an execution duration of said application thread may be minimized.

Additional processor instances may then be created using the remaining free resources. For to achieve this, in a further development of the proposed processor architecture said configuration register may be modified by said control unit to allocate at least some of the remaining data processing elements and/or processor resource units, which are not required for execution of said application thread, for additional functionality, in particular for creating additional processor mode instances.

As an example, consider a processor system which may—at most—constitute an m-issue VLIW processor instance due to its available resources. For m=4, at least the following combinations could be constituted:

one 4-issue VLIW processor instance,
maximum two 2-issue VLIW processor instances,
maximum four RISC (1-issue VLIW) processor instances,
one 2-issue and maximum two 1-issue VLIW processor instances, or
one 3-issue and one 1-issue VLIW processor instance.

Accordingly, in a further development the proposed processor architecture is adapted to create a plurality of processor mode instances, preferably of ISA-type, based on the contents of said configuration register, which contents may be modified under control of said optional control unit, in accordance with the following relation:

$$\sum_{i=1}^{N} W_i \leq m,$$

where i denotes a given processor mode instance, N denotes the total number of processor mode instances, and $W_i$ denotes the issue width of processor mode instance i.

As already stated farther up, according to a particular further development of the present invention the proposed processor architecture may comprise different types of processor units, which may be arranged and/or interconnected differently. If interconnected in an operative connection for data exchange and/or communication, these units of different types constitute the actual processor instance. In the context of this specification, said processor units can be divided in at least two groups, one group consisting of said processor resource units or tiles and the other group consisting of said data processing elements (DPE), which—according to their preferred use in embedded systems—may be implemented in the form of embedded data processing elements (EDPE). However, even when referring to EDPEs, the present specification is not limited to embedded systems. Besides the required processor resource units, exactly one (E)DPE is required for constituting a RISC processor instance. The (E)DPEs are connected viz. connectable by means of said reconfigurable data link structure or data link network, and there is freedom of choice as to which processor resource units are connected with a particular (E)DPE. The hardware arrangement of the above-mentioned processor units will be explained in more detail in the drawings section.

in prior art processor architectures, some flexibility is achieved by means of reconfiguration of the execution units. This merely consists in expanding the execution stage of a GPP. The present invention relies on a different approach in that a processor instance may be constituted at runtime by combining reconfigurable, i.e., dynamically and reconfigurably interconnectable units of diverse type, e.g., in order to constitute a RISC processor instance and/or an n-issue VLIW processor instance, as presently required.

As known to the skilled person, a processor typically may comprise different elementary processor resource units such as instruction fetching units, instruction (pre-) decoding units, execution units, register memory units, and the like. According to a further development of the inventive processor architecture, at least one of said processor resource units (also referred to as processor resource modules) can be reconfigured in the above-defined sense. Individual processor units may present different degrees of internal complexity in the form of comprised submodules/subunits or the like. Said processor resource units may be connected viz. connectable by means of said reconfigurable data link structure or data link network, wherein at least one of said connections is reconfigurable at runtime. Owing to a configuration of said connections in combination with connections to said data processing elements, processor instances of diverse type may be realized.

In an embodiment of the proposed processor architecture, wherein at least two of said data processing elements comprise an instruction fetching unit for fetching instructions for execution by said data processing elements, the respective synchronization units of said two data processing elements may be devised for synchronizing subsequent instructions to be fetched by said instruction fetching units.

According to a preferred further development of the proposed processor architecture, the latter may be adapted to temporarily constitute at runtime, based on the contents of said configuration register, and optionally under control of said control unit, at least one array mode processor instance from said group of data processing elements, wherein said array mode processor instance does not support interrupt driven code execution. Furthermore, said array mode processor instance does not require any of the additional processor resource units or tiles, as described farther up in connection with ISA-type processor instances.

As stated above, further developments of the invention comprise an operation of individual and/or multiple (E)DPEs independent from further processor resources or processor resource units. This operational state of the proposed processor architecture is hereinafter called array mode processor instance (hereinafter also referred to as "array mode"). In said array mode, the (E)DPEs also do constitute a processor instance, which is however different from a full-fletched processor instance, wherein the term "full-fletched processor instance" particularly refers to RISC or n-issue VLIW processor instances, as described farther up. A distinctive feature of said full-fletched processor instances is their interruptibility.

As described above, array mode processor instances according to a further development of the present invention do not support precise interrupts (also referred as interruptibility in the present document). In prior-art processors precise interrupts are achieved by means of complex logic and are required for running a multitasking operating system or the like. A price interrupt leaves the processor instance in a well-defined state specified by four properties: (1) the instruction pointer (IP) is saved in a known place, (2) all instructions before the one pointed to by the IP have been fully executed, (3) no instruction beyond the one pointed to by the IP has been fully executed, and (4) the execution state of the instruction pointed to by the IP is known. While full-fletched processor instances have such functionality, it is purposefully left out of the array mode. First, this reduces the amount of required resources. Second, optimization may thus be implemented which would otherwise violate interruptibility. The array mode is designed to efficiently carry out computationally intensive algorithms (e.g., FFT or DCT, often referred to as "kernels") because low-level access to hardware is possible in this mode. Interruptibility is not required when realizing said kernels.

In said array mode, instructions may be fetched from a local memory within a given (E)DPE (also referred to as "context memory"). Accordingly, in a further development of the proposed processor architecture the latter further comprising in at least one of said data processing elements at least one local memory, wherein said local memory may be adapted for storing data processing instructions at least for said array mode.

Said memory could optionally be devised in the form of a cache memory. Accordingly, in a further development of the present invention, the architecture may be adapted for temporarily constituting said local memory at runtime, based on the contents of said configuration register, which may be under control by said optional control unit, wherein preferably said local memory may be dynamically devised as cache memory.

Providing said array mode in addition to said full-fletched processor mode further enhances the efficiency of use of the available system resources, in particular of said processor resource units.

To further enhance flexibility of use of the proposed processor architecture, in a further development of the present invention, at least one of said data processing elements can be adapted for executing operations from an instruction stream out of their order in said instruction stream.

Alternatively or additionally, in a further development of the present invention, the synchronization units can be adapted for synchronizing operations from at least one instruction stream out of their order in said instruction stream.

Alternatively or additionally, in a further development of the present invention, at least one of said data processing elements can be adapted for executing in parallel at least two operations from at least one instruction stream.

Furthermore, in another development of the present invention, at least two of said data processing elements can be adapted for executing instructions from different instruction sets. As already implied farther up, an instruction set is a list of operations that a processor can execute.

To even further enhance flexibility of use of the proposed processor architecture, in a further development of the present invention, said processor architecture may comprise at least one further data processing element, and preferably a second plurality of further data processing elements, which may be devoid of a synchronization unit and thus cannot be combined with other such further data processing elements in the above-described way.

BRIEF DESCRIPTION OF THE DRAWINGS

Further developments and advantages of the present invention will now be explained by way of example only with particular reference to the appended Technical Specification and the drawing figures, wherein.

DETAILED DESCRIPTION OF THE PREFERRED EMBODIMENTS

Figure 1:
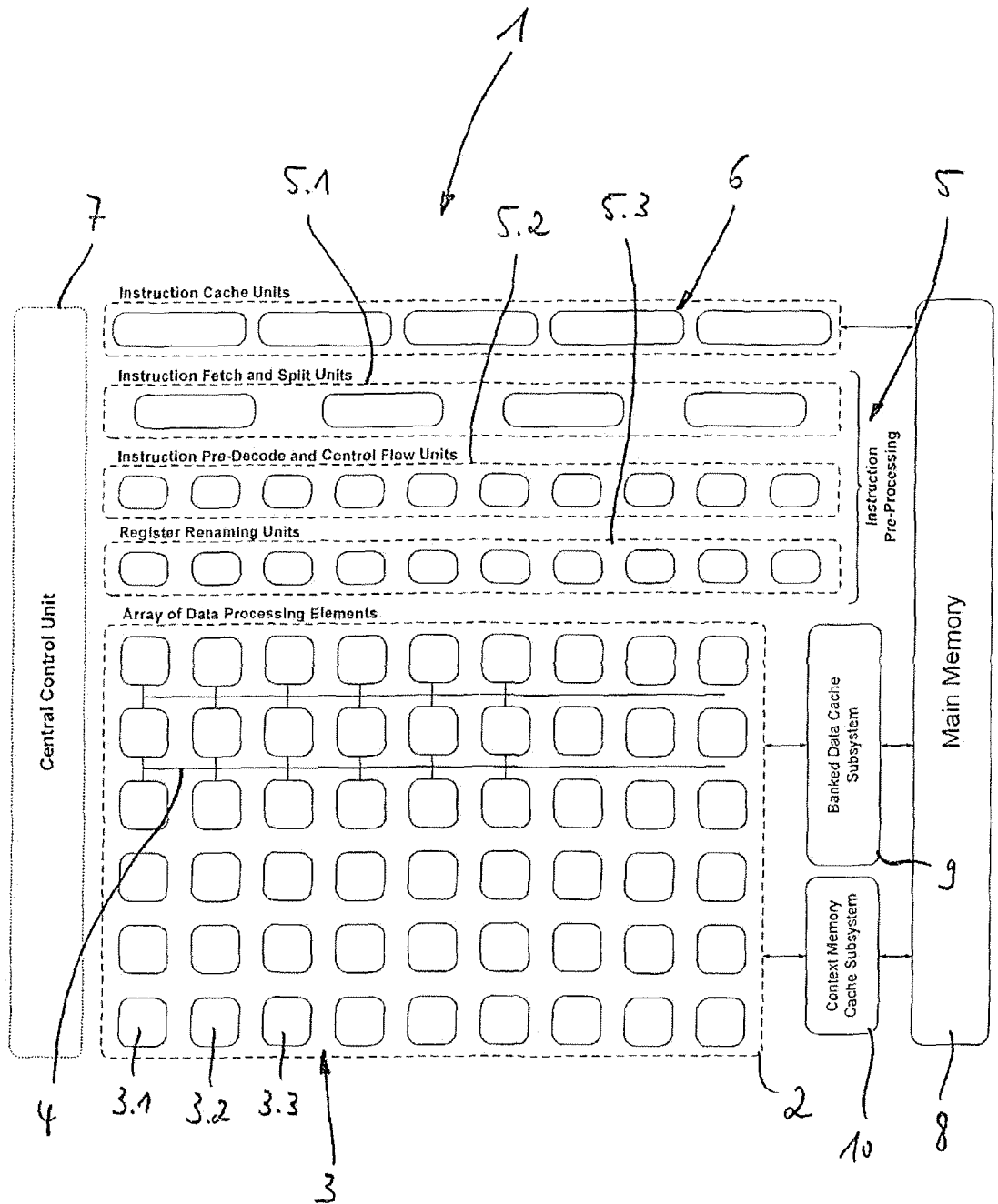
FIG. 1 shows a schematic overview of an embodiment of the processor architecture in accordance with the present invention.

FIG. 1 is a schematic overview of an embodiment of the processor architecture in accordance with the present invention, said processor architecture being denoted by reference numeral 1. Processor architecture 1 comprises an array 2 of a plurality of individual data processing elements or (E)DPEs 3.1, 3.2, 3.3, . . . , only some of which are explicitly labelled in order to avoid confusion. A detailed configuration of data processing elements 3.1, 3.2, 3.3, . . . will be described farther below with reference to FIG. 6. Data processing elements 3.1, 3.2, 3.3, . . . can be dynamically and reconfigurably interconnected by means of a data link structure 4, which is only depicted partially and highly schematically in FIG. 1. Further depicted is a plurality of processor resource units, collectively denoted by reference numeral 5. Processor resource units 5 comprise—without limitation—a plurality of instruction fetch and split units 5.1, a plurality of instruction pre-decode and control flow units 5.2, and a plurality of register renaming units 5.3, a detailed configuration of which will be described farther below with reference to FIGS. 3 through 5. Reference numeral 6 denotes a plurality of instruction cache units. Array 2 of data processing elements 3.1, 3.2, 3.3, . . . as well as processor resource units 5 and instruction cache units 6 are operatively connected with central control unit 7, which functions as the above-mentioned control unit. Processor architecture 1 further comprises a main memory 8 in operative connection with at least instruction cache units 6, and banked data cache subsystem 9 as well as context memory cache subsystem 10, both operatively interconnected between array 2 of data processing elements 3.1, 3.2, 3.3, . . . and main memory 8, respectively. Although not explicitly depicted in FIG. 1, individual data processing elements 3.1, 3.2, 3.3, . . . in array 2 can be dynamically and reconfigurably connected with processor resource units 5 and/or instruction cache units 6 via a configuration register (cf. FIGS. 4 through 6), which configuration register could potentially be modified under control of central control unit 7.

Figure 2:
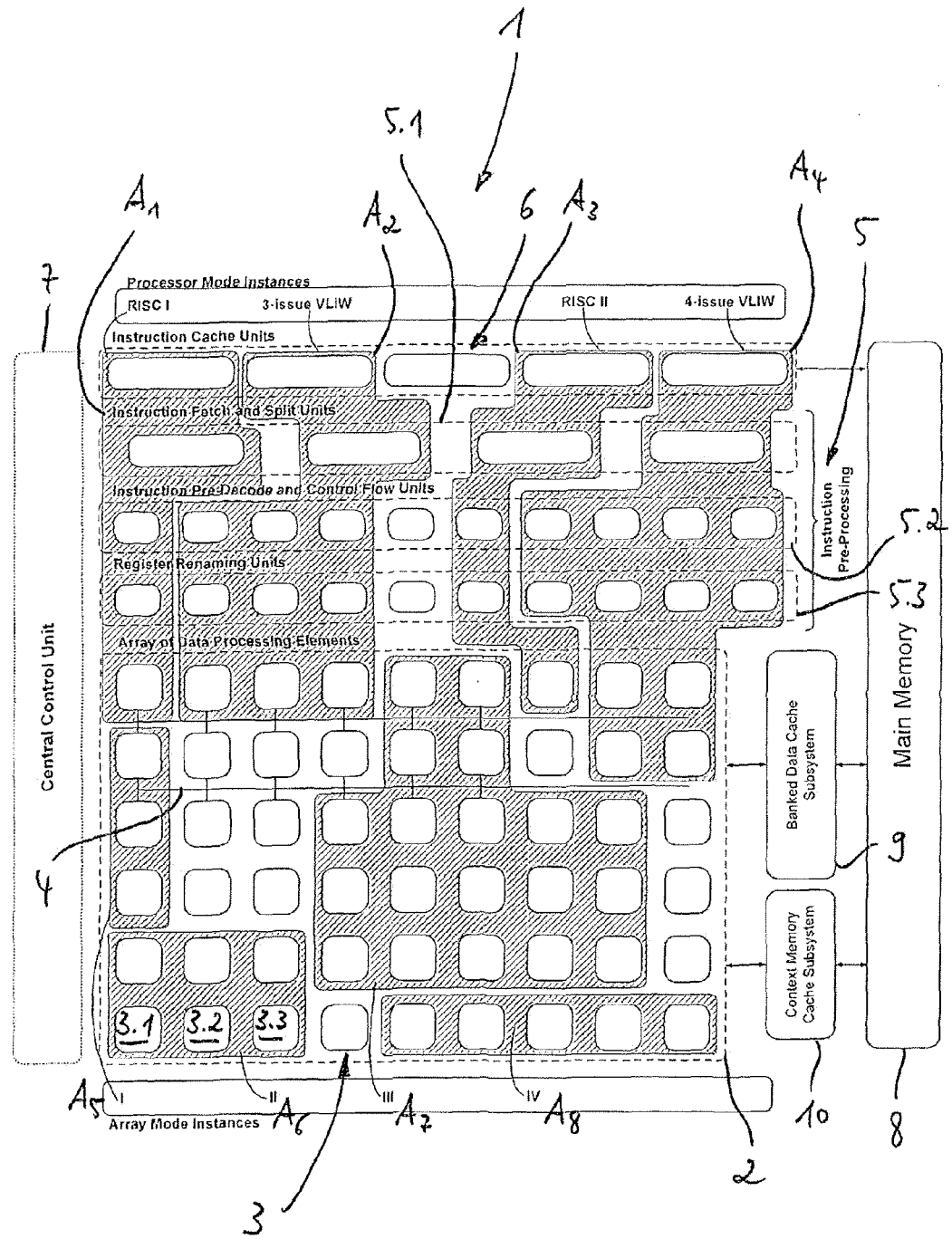
FIG. 2 shows a schematic overview of an embodiment of the processor architecture in accordance with the present invention and dynamically configured for constituting various ISA-type processor mode instances and array mode instances.

FIG. 2 shows a schematic overview of an embodiment of the processor architecture 1 of FIG. 1 in accordance with the present invention, which has been dynamically configured for constituting various ISA-type processor mode instances and array mode instances. In FIG. 2, said ISA-type processor mode instances and said array mode instances are symbolized by means of hatched areas $A_j$, j=1, 2, . . . , encompassing various (E)DPEs 3.1, 3.2, 3.3, . . . and—optionally—processor resource units 5, which are required for creating a particular processor mode.

$A_1$ symbolizes a ISA-type RISC processor mode instance denoted by reference numeral "RISC I" and comprising, respectively, one of instruction cache units 6, one of instruction fetch and split units 5.1, one of instruction pre-decode and control flow units 5.2, one of register renaming units 5.3, and a single one of data processing elements 3.1, 3.2, . . . .

$A_2$ symbolizes a ISA-type 3-issue VLIW processor mode instance denoted by reference numeral "3-issue VLIW" and comprising, respectively, one of instruction cache units 6, one of instruction fetch and split units 5.1, three of instruction pre-decode and control flow units 5.2, three of register renaming units 5.3, and three of data processing elements 3.1, 3.2, . . .

$A_3$ symbolizes a ISA-type RISC processor mode instance denoted by reference numeral "RISC II" and comprising, respectively, one of instruction cache units 6, one of instruction fetch and split units 5.1, one of instruction pre-decode and control flow units 5.2, one of register renaming units 5.3, and a single one of data processing elements 3.1, 3.2, . . . , analogous to "RISC I" but based on different system resources.

$A_4$ symbolizes a ISA-type 4-issue VLIW processor mode instance denoted by reference numeral "4-issue VLIW" and comprising, respectively, one of instruction cache units 6, one of instruction fetch and split units 5.1, four of instruction pre-decode and control flow units 5.2, four of register renaming units 5.3, and four of data processing elements 3.1, 3.2, . . . , basically analogous to "3-issue VLIW" but based on different system resources.

$A_5$ through $A_8$ respectively denote array mode processor instances bearing reference numerals "I" through "IV", which do require neither processor resource units 5 nor instruction cache units 6. In array mode, data processing elements 3.1, 3.2, . . . are provided with data directly via banked data cache subsystem 9 and context memory cache subsystem 10. Array mode instance "I" comprises three (E)DPEs, array mode instance "II" comprises six (E)DPEs, array mode instance "III" comprises 19 (E)DPEs, and array mode instance "IV" comprises five (E)DPEs.

Array mode processor instances "I" through "IV" do not support an interrupt due to their lack of processor resource units 5. As mentioned before, the array mode is designed to efficiently carry out computationally intensive algorithms (e.g., FFT or DCT, often referred to as "kernels") because low-level access to hardware is possible in this mode. Interruptibility is not required when realizing said kernels.

Figure 6:
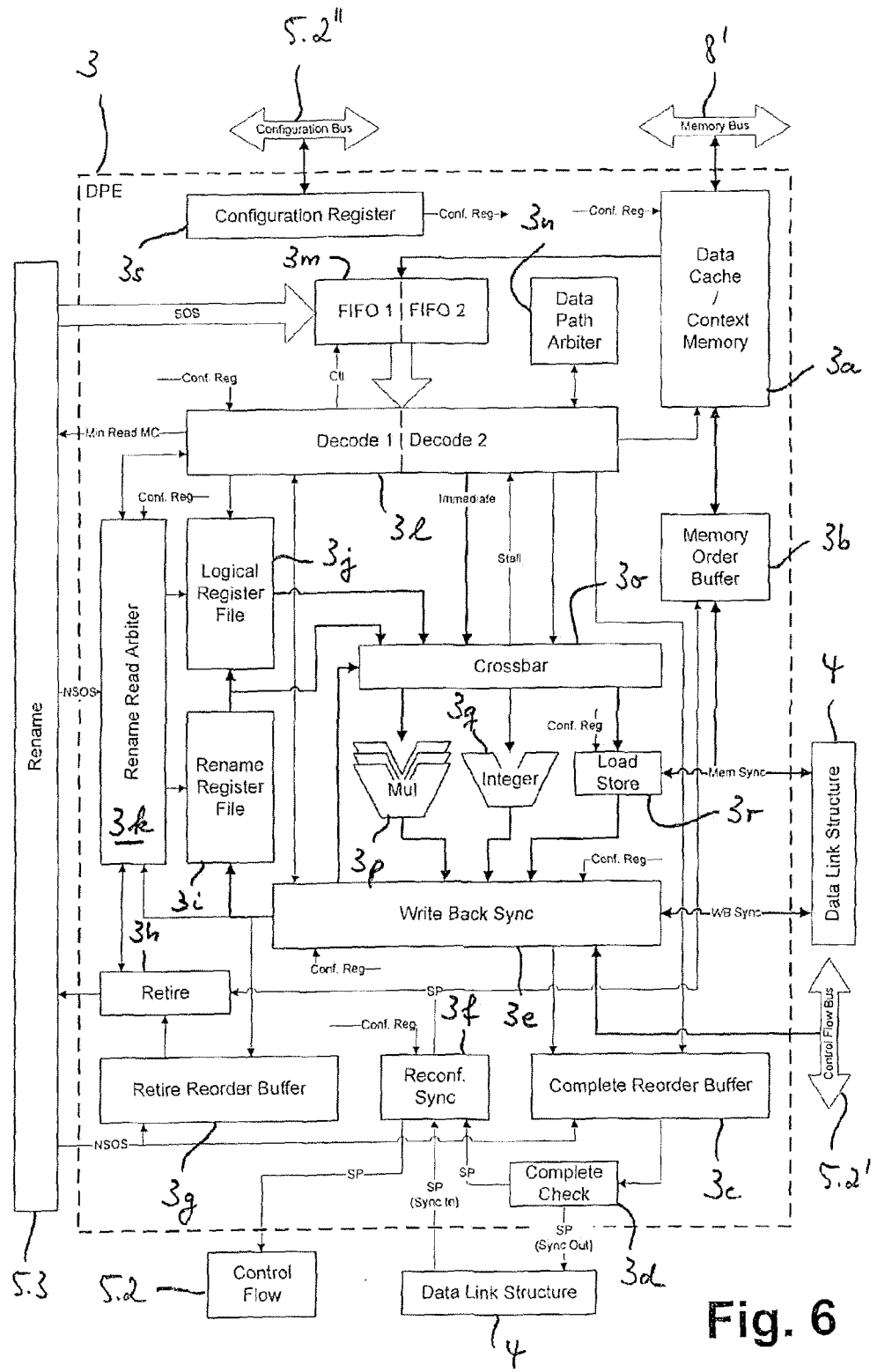
FIG. 6 shows a detailed embodiment of an individual (E)DPE as shown in FIG. 3.

In said array mode, instructions are preferably fetched from a local memory within a given (E)DPE (context memory; cf. FIG. 6). Said context memories are further connected with main memory 8 via context memory cache subsystem 10.

In the embodiment of FIGS. 1 and 2, processor architecture 1, based on the contents of the aforementioned configuration register, which will be explained in detail farther below with reference to appended FIGS. 4 through 6, and which may be controlled by means of control unit 7, is adapted to create a plurality of ISA-type processor mode instances in accordance with the previously defined relation:

$$\sum_{i=1}^{N} W_i \leq m,$$

where i denotes a given processor mode instance, N denotes the total number of processor mode instances, and $W_i$ denotes the issue width of processor mode instance i, wherein m=18.

What follows is the Technical Specification of a preferred embodiment of the proposed processor architecture which corresponds to a best-mode reduction to practice. Said Technical Specification makes reference to appended FIG. 3 through 6:

| Technical Specification | |
|---|---|
| Technical Specification | 17 |
| Design Parameters | 19 |
| Instructions | 20 |
| Logical Instruction Structure | 20 |
| Numbering of Registers | 21 |
| Exceptions | 21 |
| Logical Exceptions | 21 |
| Internal Exceptions | 21 |
| Opcode List | 21 |
| CtrlSignals | 22 |
| Conditions | 23 |
| Overview | 23 |
| Split | 24 |
| Fetch | 24 |
| Decode + Control Flow | 25 |
| Exception Handler (EH) | 25 |
| CheckMC | 26 |
| CalcIP | 26 |
| CheckPrediction | 26 |
| UpdatePrediction | 26 |
| CorrectIP | 26 |
| Branch Prediction (BP) | 27 |
| IP Filter (IPF) | 27 |
| IP History (IPH) | 28 |
| Next MC | 28 |
| Exception Table | 29 |
| Stall Sync | 29 |
| Configuration Register | 29 |
| Renaming | 29 |
| Stall Sync | 30 |
| Destination Decode Sync (DD) | 31 |
| Rename Register Allocation (RRA) | 32 |
| Destination Encode Sync (DE) | 33 |
| Mapping Clear Fifo (MCF) | 34 |
| Rename Free Fifo (RFF) | 35 |
| Mapping | 36 |
| Implementation | 37 |
| Configuration Register | 37 |
| DPE (EDPE) | 37 |
| Decode | 38 |
| Incoming operation streams | 38 |
| Decode Unit | 40 |
| Decode-Stall Check | 40 |
| Execution stage | 41 |
| Data Path Arbiter (DPA) | 42 |
| Logical Register Files (LRFs) | 42 |
| Rename Register Files (RRFs) | 42 |
| Rename Read Arbiter (RRA) | 43 |
| Ports | 43 |
| Crossbar | 44 |
| Ports | 45 |
| ALU Paths | 46 |
| Ports | 46 |
| Load Store | 47 |
| Memory Order Buffer (MOB) | 48 |
| Data Cache/Context Memory (DCCM) | 48 |
| Write Back Sync (WB) | 48 |
| Ports: | 50 |
| Control Flow Bus (CFB) | 50 |
| Retire Reorder Buffer (RROB) | 51 |
| Complete Reorder Buffer (CROB) | 53 |
| Complete Check (CC) | 54 |
| Reconfigurable Sync (RS) | 55 |
| Retire | 55 |
| Configuration Register | 56 |
| Sync-Protocol | 56 |
| Sync-Destaller (SD) | 57 |
| Abbreviations | 58 |

Design Parameters

The architecture is configurable by various design-time parameters, e.g.:

| | |
|---|---|
| AluPath | Number of ALU Path resources. |
| StreamCount | Number of parallel input stream per DPE. (Minimum 1) |
| DSlotCount | Number of Data Rename Registers that could be written within one cycle in one DPE. |
| ESlotCount | Number of Event Rename Register that could be written within one cycle in one DPE. |
| DFwdPorts | Number of Data Forward Ports |
| EFwdPorts | Number of Event Forward Ports |
| IEMDChannels | Number of IEM Data Channels between two DPEs (minimal 1). |
| IEMEChannels | Number of IEM Event Channels between two DPEs (minimal 0). |
| MCBits | Bit width of Modulo Cycle for unambiguous identification of one instruction bundle within the processor pipeline. |
| DRegNoBits | Bit width required for addressing the data registers. This value implicitly specifies the number of data registers ($2^{DRegNoBits}$). |
| ERegNoBits | Bit width required for addressing the event registers. This value implicitly specifies the number of event registers ($2^{ERegNoBits}$). |
| DReadPorts | Number of read ports of Data Register Files. |
| DWritePorts | Number of write ports of Data Register Files. |
| EReadPorts | Number of read ports of Event Register Files. |
| EWritePorts | Number of write ports of Event Register Files. |
| CWritePorts | Number of write ports of CROB |
| InstrDSrcCount | Number of data source registers per instruction (=2) |
| InstrESrcCount | Number of event source registers per instruction (=1) |
| InstrDDstCount | Number of data target registers per instruction (=1) |
| InstrEDstCount | Number of event target registers per instruction (=1) |
| DBitWidth | Bit width of data registers (=32) |
| EBitWidth | Bit width of event registers (=1) |
| OpcodeBits | Bits per Opcode (=5) |
| CtrlSigBits | Bits per CtrlSignals (=4) |

Instructions
Logical Instruction Structure
A logical instruction consists of the following elements:
  Opcode
    Opcode for selecting the data path
    CtrlSignals for the data path
  Operanden
    InstrDSrcCount data source registers (default 2)
    InstrESrcCount event source registers (default 2)
    InstrDDstCount data target registers (default 1)
    InstrEDstCount event target registers (default 1)
Numbering of Registers
The ISA consists of an amount of logical data and event registers. The registers are identified by R0, R1, ..., R($2^{DRegNoBits}$) for data and E0, E1, ..., E($2^{ERegNoBits}$) for event registers. R0 and E0 are always set to zero.

Exceptions

| Logical Exceptions | | | |
|---|---|---|---|
| Acronym | Data | Parameter | Description |
| DIV0 | — | — | Division by Zero |
| MMU | FaultAddr | Type (Code) | Memory Management Unit. Error on Address Translation |
| UNKN | — | — | Unknown Opcode |
| INT | IntrNo | — | Interrupt |

| Internal Exceptions | | | |
|---|---|---|---|
| Acronym | Data | Parameter | Description |
| SPEC | — | — | Speculation Failed |
| JMP | Target address | Relative | Jump |
| CALL | Target address | Relative | Call |
| RET | — | — | Return |

| Opcode List | | | | | | |
|---|---|---|---|---|---|---|
| Op | Mnemonic | Exception | CtrlSignals | Event In | Event Out | ALU Path |
| 0 | NOP | — | — | — | — | — |
| 1 | OR | — | 0000 | — | Zero | Integer |
| 1 | AND | — | 0001 | — | Zero | Integer |
| 1 | XOR | — | 0010 | — | Zero | Integer |
| 1 | NOT | — | 0100 | — | Zero | Integer |
| 4 | SHL | — | — | — | Shifted-Out Bit | Integer |
| 5 | SHR | — | S | — | Shifted-Out Bit | Integer |
| 6 | ADD | — | S, SAT | Carry | Carry | Integer |
| 7 | SUB | — | S, SAT | Carry | Carry | Integer |
| 8 | MUL | — | S, SAT, HR | — | — | Mul |
| 9 | DIV | DIV0 | S, RE | — | — | Div |
| 10 | LD | MMU | W, S | — | Lowest-Bit | LS |
| 11 | ST | MMU, SPEC | W | — | Data | LS |
| 12 | XCHG | MMU, SPEC | W, S | — | — | LS |
| 13 | CMP | — | COND | — | Cmp | Integer |
| 14 | SEL | — | — | Flag | — | Integer |
| 15 | JMP | JMP | REL | Taken | — | Integer |
| 16 | CALL | JMP | REL | — | — | Integer |
| 17 | RET | JMP | — | — | — | Integer |
| 18 | EXC | UNKN, SPEC | EXC | — | — | Integer |
| 19 | INT | INT | — | — | — | Integer |
| 20 | MOV | — | S | Data | Data | Integer |

| CtrlSignals | | | |
|---|---|---|---|
| Acronym | Bit Width | Name | Description |
| SAT | 1 | Saturation | |
| S | 1 | Signed | Signed (1) or Unsigned (0) |
| HR | 1 | High Result | Return the upper half of the result e.g. on a multiplication |
| RE | 1 | Remain | Get remainder of division |
| W | 2 | Bit Width | 00 = 8, 01 = 16, 10 = 32, ... |
| REL | 1 | Relative | Relative (1) or Absolute (0) |
| COND | 4 | Condition | Condition for comparison |
| EXC | 4 | Exception | Number of exception |

| Conditions | | | | |
|---|---|---|---|---|
| Code | Name | Flags | | Description |
| 0 | N | 0 | | Never |
| 1 | E | flag_ze | | Equal |
| 2 | LE | flag_ze \|\| flag_ov | | Less or Equal |
| 3 | L | flag_ov | | Less |
| 4 | LEU | flag_ze \|\| flag_cy | | Less or Equal Unsigned |
| 5 | CS | flag_cy | | Carry Set/Less Unsigned |
| 6 | NEG | flag_ne | | Negative |
| 7 | VS | flag_ov | | Overflow Set |
| 8 | A | 1 | | Always |
| 9 | NE | !flag_ze | | Not Equal |
| 10 | G | !flag_ze && !flag_ov | | Greater |
| 11 | GE | !flag_ov | | Greater or Equal |
| 12 | GU | !flag_ze && !flag_cy | | Greater Unsigned |
| 13 | CC | !flag_cy | | Carry Clear/Greater or Equal Unsigned |
| 14 | POS | !flag_ne | | Positive |
| 15 | VC | !flag_ov | | Overflow Clear |

| Flags | | |
|---|---|---|
| Flag | Name | Description |
| flag_ze | Zero | a − b == 0 |
| flag_cy | Carry | carry(a − b) |
| flag_ne | Negative | MSB(a − b) |
| flag_ov | Overflow | (MSB(a) == MSB(b)) != MSB(a − b) |

Overview

Figure 3:
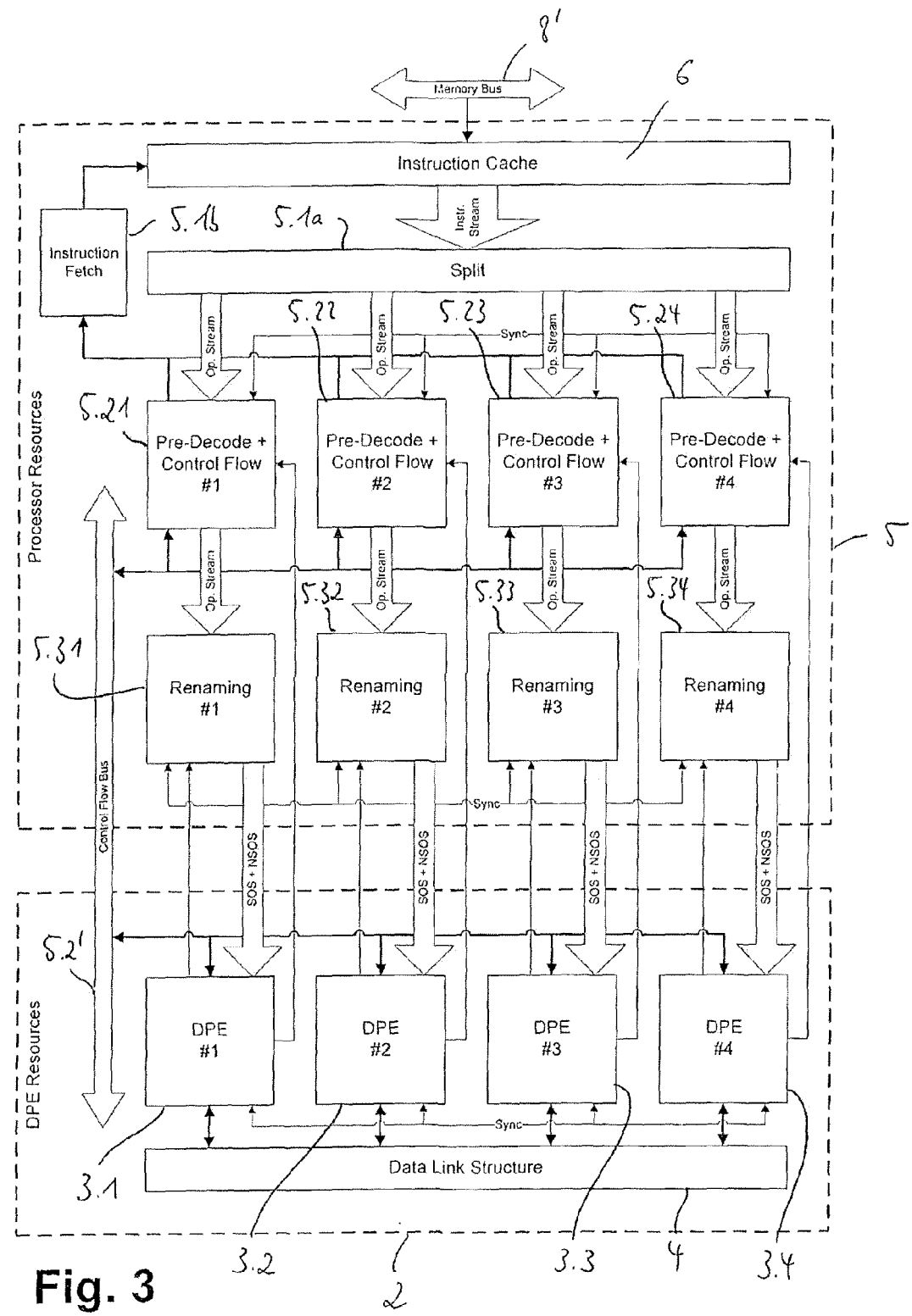
FIG. 3 shows a more detailed overview of an embodiment of the data processing elements and the processor resource units comprised in the processor architecture of FIG. 1.

FIG. 3 shows a more detailed overview of an embodiment of the data processing elements and the processor resource units as comprised in the processor architecture of FIG. 1. In FIGS. 3 through 6, same reference numerals denote the same elements or elements having the same function as corresponding elements in FIGS. 1 and 2.

Instruction cache 6 is operatively connected with memory bus 8' (and further with main memory 8; cf. FIGS. 1 and 2). It provides an instruction stream to instruction split unit 5.1a which is depicted separately from instruction fetch unit 5.1b. Instruction split unit 5.1a splits instruction stream in four separate operation streams provided to pre-decode and control flow units 5.21 through 5.24 (additionally numbered "#1" through "#4"). Pre-decode and control flow units 5.21 through 5.24 are operatively connected with respective register renaming units 5.31 through 5.34 (additionally numbered "#1" through "#4") and provide them with respective operation streams. Register renaming units 5.31 through 5.34 are operatively connected with respective data processing elements (DPE) 3.1 through 3.4 (additionally numbered "#1" through "#4") and provide them with respective stalling and non-stalling operation streams SOS and NSOS, respectively. Data processing elements (DPE) 3.1 through 3.4 are interconnected by means of data link structure 4. Control flow bus 5.2' is accessible by pre-decode and control flow units 5.21 through 5.24 and by data processing elements (DPE) 3.1 through 3.4. Instruction fetch unit 5.1b is operatively connected with both pre-decode and control flow units 5.21 through 5.24 and instruction cache 6. Synchronization ("Sync") is provided between pre-decode and control flow units 5.21 through 5.24, between register renaming units 5.31 through 5.34, and between data processing elements (DPE) 3.1 through 3.4, respectively. All of said synchronized units comprise individual synchronization units, which will be shown in subsequent FIGS. 4 through 6.

Split

The architecture allows realizing processor mode instances of different ISA types (e.g. RISC, n-issue VLIW) that in turn could use different operation formats. As a result, the instructions in memory must not necessarily be aligned. For handling unaligned instruction placement in memory as well as to split up an instruction in the embedded operations, the Split Unit 5.1*a* is used. Therefore, in a first step, the Split Unit 5.1*a* gets the fetched cache lines from the Instruction Cache 6 and extracts the individual instructions. In a second step, the instructions are further split up in the embedded operations. These are then sent to the successive units for further processing. The Split Unit 5.1*a* thereby stalls with these processing tasks in case one of the successive units cannot take over the extracted operations.

Fetch

The Instruction Fetch unit 5.1*b* is shared by the Control Flow units 5.21-5.24. Each active Control Flow unit 5.21-5.24 sends the cache line and instruction pointer to be fetched next to Instruction Fetch. Arbitration is done and the cache lines are successively fetched by passing the memory addresses to Instruction Cache 6. The cache lines are directly transferred to the Split Unit 5.1*a* from the Instruction Cache 6 including additional information to locate the start address of an instruction within a cache line.

Decode+Control Flow

Figure 4:
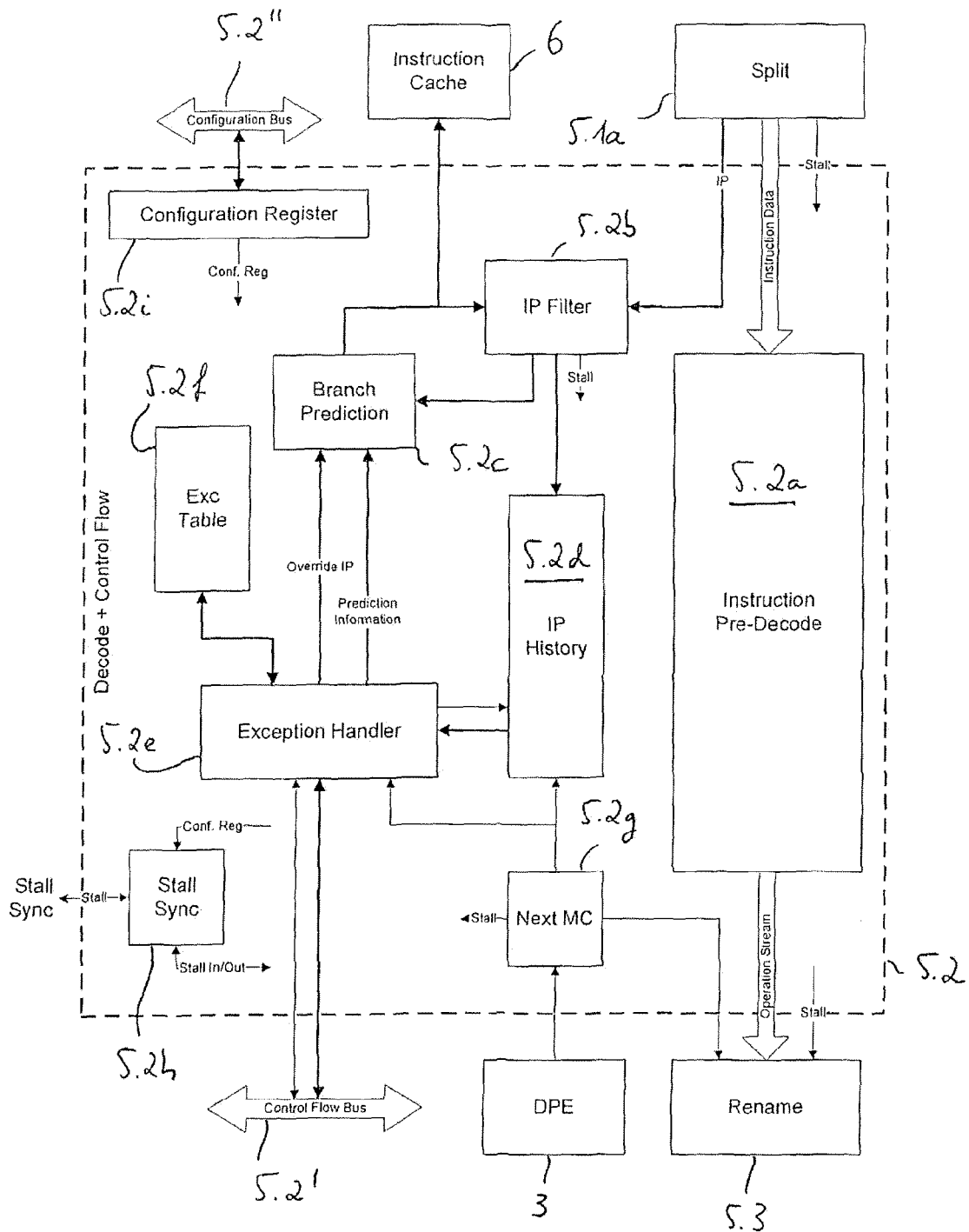
FIG. 4 shows a detailed embodiment of a renaming processor resource unit as shown in FIG. 3.

FIG. 4 shows a detailed embodiment of an individual decode and control flow processor resource unit 5.2 as shown in FIG. 3.

Decode and control flow processor resource unit 5.2 comprises instruction pre-decode unit 5.2*a* in operative connection with both split unit 5.1*a* and register renaming unit 5.3. It further comprises IP filter unit 5.2*b*, branch prediction unit 5.2*c*, IP history unit 5.2*d*, exception handler unit 5.2*e*, exception table 5.2*f*, next MC unit 5.2*g*, stall sync unit 5.2*h* as its individual synchronization unit, and configuration register 5.2*i*, said configuration register 5.2*i* being operatively connected with configuration bus 5.2" and stall sync unit 5.2*h*. Units 5.2*a* through 5.2*i* are mutually interconnected as indicated by corresponding lines in FIG. 4.

Exception Handler (EH)

The EH 5.2*e* is connected to the DPEs (jointly denoted by reference numeral 3) by a bus 5.2' and receives all exceptions occurring in the DPEs 3. While handling the exceptions the following tasks are fulfilled:

1. CheckMC: The exception must be newer that the last handled exception.
2. CalcIP: The new Instruction Pointer (IP) is calculated.
3. CheckPrediction: Check if the new IP has been predicated correctly.
4. UpdatePredication: Branch Prediction is informed about the exception address
5. CorrectIP: Correct the IP on a misprediction.

CheckMC

The EH 5.2*e* contains one 2^MCBits width register (not shown) that contains for each MC a 1 if the result of this MC must be discarded because of an exception. This content of the register is reset for each new MC and set on an exception.

The MC of one exception is compared with this register. If the MC has been already discarded the exception will be ignored and result is returned on the bus 5.2' that the instruction has been successfully completed without exception.

CalcIP

Within this state a new IP address is calculated. Depending of the type of the exception a different scheme is used:

| Type | NewIP |
| --- | --- |
| Logical exception | ExcTable[ExcNo] |
| Speculation failed | IPHistory[ExcMC].IP |
| Absolute jump/call/return | Parameter |
| Relative jump/call | IPHistory[ExcMC−1].IP + IPHistory[ExcMC−1].Len + Parameter |

CheckPrediction

In case of a jump, call, or return it is checked whether the jump has been predicted correctly. This is the case if IPHistory[ExcMC].IP==NewIP. In this case no exception is signalled on the bus.

UpdatePrediction

In case of a jump, call, or return information are transferred to the Branch Prediction unit 5.2*c* to update the internal tables.

CorrectIP

The exception is valid and the new IP address is transferred to the Branch Prediction unit 5.2*c*. Simultaneously, the range of [ExcMC, NextMC-1] is invalidated and it is transferred to the DPEs 3 using the bus infrastructure 5.2'.

Branch Prediction (BP)

The BP Unit 5.2*c* must fulfil several tasks. The unit communicates directly with the Instruction-Cache 6 and determines memory addresses that have to be loaded to cache lines of the Instruction-Cache 6. Only on start-up or in case of an exception the correct IP is available. The following cache lines are loaded based on the branch prediction.

1. Instruction-Cache
   => Valid (Bit)
   => Addr (? Bits)
   => IsStartAddr (? Bits)
   <= Stall (Bit)
2. IP Filter
   => Reset (Bit)
   => Valid (Bit)
   => Replace (Bit)
   => StartAddr (? Bits)
   => EndAddr (? Bits)
   <= Stall (Bit)

IP Filter (IPF)

The IP Filter 5.2*b* checks all incoming operations and filters all operations that are not needed anymore. In case of an exception it could happen, that e.g. operations in prior pipeline stages are not needed anymore. These operations are filter by this unit.

IPF 5.2*b* gets the start and end address of the predicted execution ranges signalled. The execution ranges are buffered in a FIFO and successively checked. If Valid is set the address data will be valid and it will be stored into the FIFO. The Replace bit indicates in this case if the latest FIFO entry should be replaced. Otherwise a new entry will be pushed onto the FIFO. The Stall bit indicates a full FIFO.

After a restart of the branch predication the Reset bit is set and therefore the entire FIFO is cleared. Concurrently the first execution range is transmitted [StartAddr, EndOfCacheLine]. As long as no jump is predicted the cache lines are fetched successively and the execution range is permanently increased by adapting the EndOfCacheLine signal and setting the Replace bit. If a jump is predicated the EndOfCacheLine signal will updated a last time to the address of the instruction containing the jump operation. In the next cycle a new execution range including the jump's target address is transmitted.

Split
    => Valid (Bit)
    => Addr (? Bits)
    => Restart (Bit)
General
    <= Stall (Bit)

To filter the operations transmitted by Split unit 5.1a, the address of the current operation is compared with the start and end address of the current executing range. If the address is outside the execution range the Stall bit will be set and the operation is discarded. If the Restart bit is set the next execution range within the FIFO is used. This is only the case if already one previous operation was inside the current execution range.

IP History (IPH)

IPH 5.2d comprises a buffer of 2^MCBits entries storing per MC the IP address and the length of the instruction/operation.

Therefore split unit 5.1a transfers the IP and the length of the operation transmitted. This information is stored at the entry indicated by NextMC if the Stall bit is unset. Concurrently, the exception handler 5.2e is able to read from IPH 5.2d.

Next MC

The Next MC unit 5.2g allocates the next MC number if the Stall signal is unset.

Thereby it must check that no MC overflow appears. For that purpose Next MC 5.2g gets the completed MC from DPE 3 differentially transmitted. The Stall signal is set if an overflow would occur.

Exception Table

The Exception Table 5.2f contains a jump table for logical exceptions. The table can be accessed by the Exception Handler 5.2e. Optionally the Exception Table 5.2f is omitted and replaced by a single register. In this case the Exception Table 5.2f must be realized in software.

Stall Sync

The Stall Sync unit 5.2h synchronizes stalling between the Decode and Control Flow units such as 5.2 in the same processor instance. Its major task is the generation of the Stall signal. Therefore, the Stall Sync unit 5.2h is connected with neighbouring Decode and Control Flow processor resource units such as 5.2. Based on the contents of the configuration register 5.2i the Stall Sync unit 5.2h is adapted to synchronize the Stall signal with all other Decode and Control Flow units such as 5.2h involved in the same processor instance.

Configuration Register

The Configuration Register 5.2i stores the configuration of the Decode+Control Flow unit 5.2. It can be accessed by the Configuration Bus 5.2".

Renaming

Figure 5:
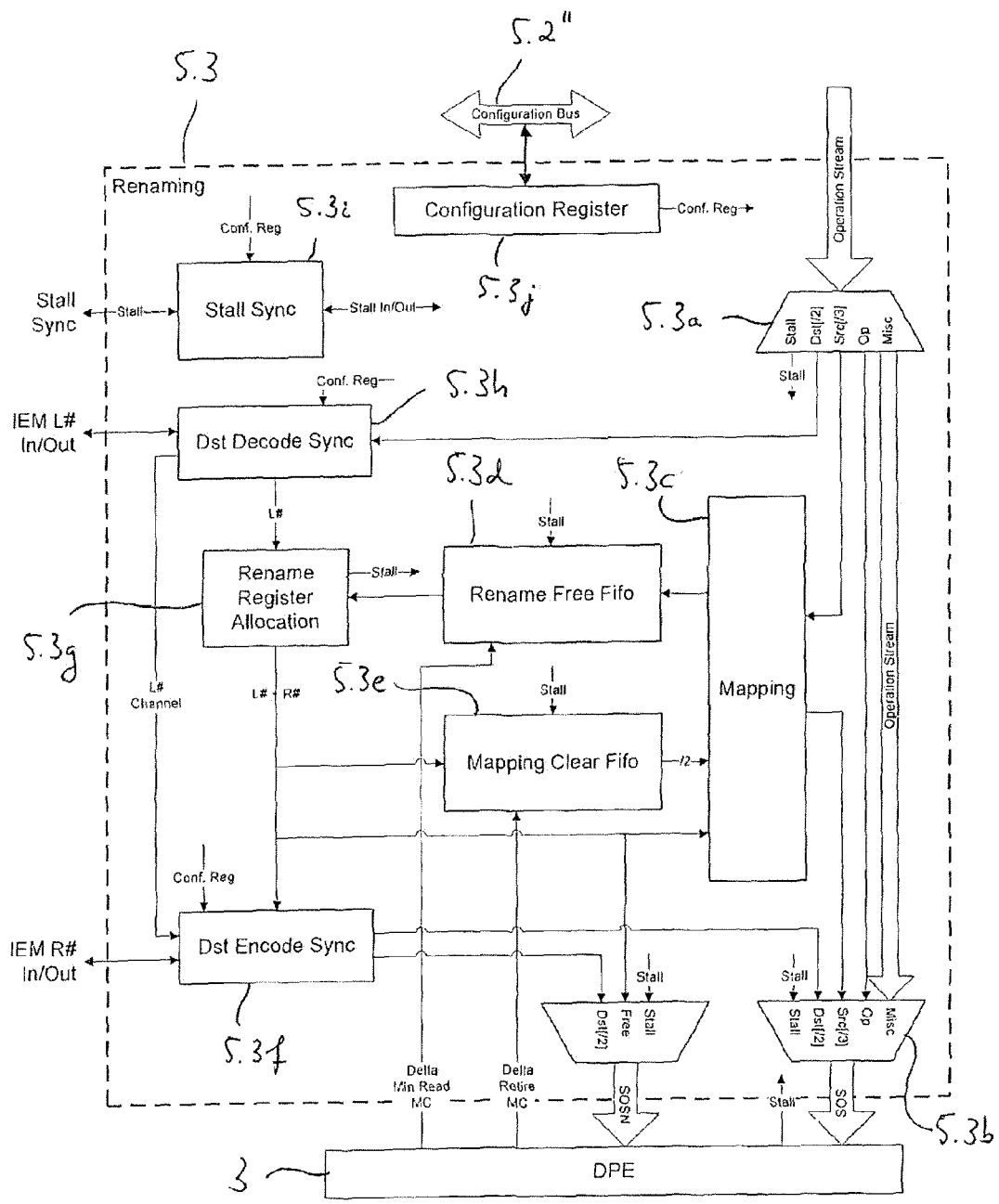
FIG. 5 shows a detailed embodiment of a decode and flow control processor resource unit as shown in FIG. 3.

FIG. 5 shows a detailed embodiment of a renaming processor resource unit 5.3 as shown in FIG. 3.

At reference numeral 5.3a, operation stream is received from pre-decode and control flow processor resource unit 5.2 (cf. FIG. 4). It is then passed on to DPE 3 as stream SOS via reference numeral 5.3b. Renaming processor resource unit 5.3 further comprises mapping unit 5.3c, rename free FIFO unit 5.3d, mapping clear FIFO unit 5.3e, destination (Dst) encode sync unit 5.3f, rename register allocation unit 5.3g, Dst decode sync unit 5.3h, and stall sync unit 5.3i. Units 5.3a through 5.3i are mutually interconnected as indicated by corresponding lines in FIG. 5. Renaming processor resource unit 5.3 also comprises configuration register 5.3j operatively connected with configuration bus 5.2" and units 5.3f, h, i. Units 5.3f, h, i constitute a distributed synchronization unit.

Renaming unit 5.3 gets decoded operations transmitted from the upper stages (cf. FIGS. 3 and 4). Its major task is the renaming of source and target registers of the operations. Therefore, all units within renaming unit 5.3 exist twice, one for renaming data and one for renaming event registers. For complexity reduction within the description of the units, data and event registers are not explicitly listed or depicted twice. All signal names including a "?" exists twice one for data (D) and one for events (E). The incoming operation stream comprises the follow signals:

Stall (bit)
MC—Modulus Cycle
Stream[/StreamCount]
    Opcode (OpcodeBits bits)
    CtrlSignals (CtrlSigBits bits)
    ?Src[/Instr?SrcCount]—Source registers (data and event)
        Type—Source Type (0=Register, 1=Immediate)
        LoNo—Logical register number
    ?Dst[/Instr?DstCount]—Target register (data and event)
        XEDPENo—DPE number
        LoNo—Logical register number
    ?Imm (?BitWidth)—Immediate The logical register number 0 is always hardcoded to a value of 0. If a source or target operand is unused, the register number 0 will be set.

Stall Sync

The Stall Sync unit 5.3i synchronizes stalling between the Renaming processor resource units such as 5.3 in the same processor instance. Its major task is the generation of the Stall signal. Therefore, the Stall Sync unit 5.3i is connected with neighbouring renaming processor resource units such as 5.3. Based on the contents of the configuration register 5.3j the Stall Sync unit 5.3f is adapted to synchronize the Stall signal with all other Renaming processor resource units such as 5.3 involved in the same processor instance.

The Stall signal is generated by a logical disjunction of all Stall input signals.

StallOut (Bit)
StallIn[ ] (Bit)
    Register Rename Allocation
    Mapping Clear Fifo
    Rename Clear Fifo
    DPE
Destination Decode Sync (DD)

Destination Decode Sync unit 5.3h maintains the event and data target register numbers. Based on the contents of the configuration register 5.3j the DD unit 5.3f is adapted to send and receive rename register numbers to and from other Renaming units 5.3 involved in one processor instance. Each target register could refer either to the DPE 3 connected with the renaming unit 5.3 or to a distant DPE. If the target register belongs to a distant DPE it must be renamed by the corresponding Renaming unit. In this case DD 5.3h transfers the logical register number to the corresponding Renaming unit and Destination Encode Sync 5.3f receives the result. Thereby, a renaming request to a corresponding Renaming unit is transferred on one channel and the answer is expected on the same channel number.

?Dst[/StreamCount]—Target register (data and event)
    => XEDPENo—DPE number
    => LoNo—Logical register number
IEM?NoOut[/3][/IEM?Channels]
    => LoNo—Logical register number IEM?NoIn[/3][/IEM?Channels]
    <= LoNo—Logical register number
IEM?Port[/StreamCount]
    <= XEDPENo—DPE number
    <= ChannelNo—Channel number for the target
    <= LoNo—Logical register number
?RegOut[/DSlotCount]
    <= XEDPENo—DPE number
    <= ChannelNo—Channel number for the target
    <= LoNo—Logical register number As input DD 5.3h receives the event and data target register of the operation stream. For a XEDPENo!=0 the logical register number is routed to the respective IEM?NoOut output port. A non-used output port is indicated by assigning a register number of 0. Concurrently the XEDPENo, logical register number, and ChannelNo signals are set on the IEM?Port output if Dst belongs to a distant DPE. Thereby, Destination Encode Sync 5.3f is able to correctly use the channel including the Renaming result of the distant DPE.

AS output data the Dst and IEM?NoIn inputs are used. Dst will be used if XEDPENo!=0 and No!=0. Since StreamCount<=SlotCount is true a direct mapping is used, i.e. Dst in stream 1 is routed to slot 1. The remaining free slot ports are filled with register numbers coming from other Renaming units if No in IEM?NoIn is not zero.

Rename Register Allocation (RRA)

RRA 5.3g maintains the free rename register numbers. For each logical register number (!=0) in RegIn a new rename register number must be allocated. Thereby, it is distinguished between event and data registers. The register allocation is done in round robin scheme and only two counters are required for register allocation. One counter contains the next free register number. It is initialized by 0 on startup and will be incremented (including overflow) if a new register is allocated. Concurrently, the second counter stores the number of free registers. The StallOut signal will be set if not enough register resources are available. The XEDPENo and ChannelNo signals are passed through without modification.

?RegIn[/DSlotCount]
    => XEDPENo—DPE number
    => ChannelNo—Channel number of target
    => LoNo—Logical register number
?RegOut[/DSlotCount]
    => XEDPENo—DPE number
    => ChannelNo—Channel number of target
    => LoNo—Logical register number
    => ReNo—Rename register number
=> ?Free (log 2(?SlotCount) Bits)—Number of freed registers
=> StallOut—Stall signal
<= StallIn—A stall of the Renaming stage is signalled. The internal state of this unit will not be changed.

Destination Encode Sync (DE)

DE unit 5.3f sends and receives the renamed register numbers to the distant DPEs. Based on the contents of the configuration register 5.3j the DE unit 5.3f is adapted to send and receive rename register numbers to and from other Renaming processor resource units 5.3 involved in one processor instance.

?RegIn[/?SlotCount]
    => XEDPENo—DPE number
    => ChannelNo—Channel number for target
    => LoNo—Logical register number
    => ReNo—Rename register number
IEM?Port[/StreamCount]
    => XEDPENo—DPE number
    => ChannelNo—Channel number for target
    => LoNo—Logical register number
IEM?ReNoOut[/3][/IEM?Channels]
    => ReNo—Rename register number
IEM?ReNoIn[/3][/IEM?Channels]
    <= ReNo—Rename register number
?Dst[/StreamCount]—Target register
    => XEDPENo—DPE number
    => LoNo—Logical register number
    => ReNo—Rename register number DE unit 5.3f gets the renamed register numbers from RRA 5.3g. If it is XEDPENo!=0 the rename register number will routed to the IEM?ReNoOut output identified by XEDPENo and ChannelNo.

The ?Dst output ports are controlled by IEM?Port. If it is IEM?Port[ ].XEDPENo!=0 the IEM?ReNoIn[ ][ ].ReNo and IEM?Port[ ].LoNo will be used. Otherwise, the signals from the corresponding RegIn input port will be used if IEM?Port[ ].XEDPENo==0.

Mapping Clear Fifo (MCF)

The MCF unit 5.3e is a FIFO with one write and two read ports. For each MC the allocated mappings (rename and logical register number) are stored. It is directly connected to the output ports of RRA 5.3g. From the DPE 3 the number of retired MCs (max. 2) per clock cycle is transferred. Per retired MC one value is popped and transmitted to the Mapping unit 5.3c to erase the mapping entry.

Fifo[/2^MCBits]
    ?Mapping[/?SlotCount]
        LoNo—Logical register number
        ReNo—Rename register number
A LoNo of 0 indicates an empty entry.
=> DeltaRetireMC (2 bits)—Number of MCs that are retired within this cycle (max. 2)
=> ?MappingIn[/?SlotCount]
<= ?MappingOut[/?SlotCount][/2]
<= StallIn (Bit)

Rename Free Fifo (RFF)

The RFF unit 5.3d controls the deallocation of allocated rename registers. After removing a mapping from the Mapping unit 5.3c, a rename register can be only reallocated if no operation exists anymore that must read from this register. The RFF 5.3d is realized by a FIFO with one write and two read ports. For each MC it stores the number of rename registers that were freed in this MC. In each cycle the number of freed rename registers are signalled from the Mapping unit 5.3c and pushed into the FIFO. From the DPE 3 in each cycle the number of finished read MCs is transmitted (max. 2) for that all operations within the MC have read their registers. Per finished read MC one value is popped from the FIFO. All popped values within one cycle are added and passed to RRA 5.3g.

Fifo[/2^MCBits]
    ?Free (log 2(?SlotCount)+1 bits)
The RFF has the following signals:
=> StallIn (bit)
=> DeltaMinReadMC (2 bits)—Number of MCs that finished reading all operands (max. 2).
=> ?FreeIn (log 2(?SlotCount) bits)
<= ?FreeOut (log 2(?SlotCount)+1 bits)
The number of freed rename registers is passed to RRA.

Mapping

Mapping unit 5.3c performs a mapping from logical to rename register numbers. In each cycle all source operands are queried. If no mapping is existent for the source operand, the logical register number will be passed through without modification. Otherwise, the stored rename register number is used. The RRA unit 5.3g generates new mappings for the target registers. These mappings are stored within the following cycle in the Mapping unit 5.3c. An existing mapping for one logical register number is thereby overwritten. Concurrently, the MCF 5.3e transfers all mapping that should be deleted. Before deleting a mapping it must be checked if the logical register still maps to the renaming register. If this is true, the valid bit is simply cleared and otherwise it is kept unchanged.

Mapping[/2^?RegNoBits]
    Valid (bit)
    ReNo (?RegNoBits)—Rename register number The Mapping unit 5.3c has the following signals:
?SrcIn[/StreamCount][/Instr?SrcCount]
    LoNo (?RegNoBits)—Logical register number
?SrcOut[/StreamCount] [/Instr?SrcCount]
    Type (Bit)—Register type (0=logical, 1=rename)
    No (?RegNoBits)—Register number
?CreateMapping[/?SlotCount]
    LoNo (?RegNoBits)—Logical register number
    ReNo (?RegNoBits)—Rename register number
?RemMapping[/2][/?SlotCount]
    LoNo (?RegNoBits)—Logical register number
    ReNo (?RegNoBits)—Rename register number Implementation For the implementation two different register files could be used: the first for valid bits and the second for ReNo values. For the two register files the following numbers of parts are required:
Valid Read=StreamCount*Instr?SrcCount
Valid Write=?SlotCount+2*?SlotCount=3*?SlotCount
ReNo Read=StreamCount*Instr?SrcCount+2*?SlotCount
ReNo Write=?SlotCount Configuration Register The Configuration Register 5.3j stores the configuration of the Renaming unit 5.3. It can be accessed via the Configuration Bus 5.2".

DPE (EDPE)

FIG. 6 shows a detailed embodiment of an individual (E)DPE 3 as shown in FIG. 3.

(E)DPE 3 is operatively connected with configuration bus 5.2", memory bus 8', control flow bus 5.2', and data link structure 4. It is further connected operatively with pre-decode and control flow processor resource unit 5.2 (cf. FIG. 4) and register renaming processor unit 5.3 (cf. FIG. 5). DPE 3 comprises the following units: local memory denoted as data cache/context memory unit 3a, memory order buffer unit 3b, complete reorder unit 3c, complete check unit 3d, write back sync unit 3e, reconfiguration sync unit 3f, retire reorder buffer unit 3g, retire unit 3h, rename register file unit 3i, logical register file unit 3j, rename read arbiter unit 3k, decode ½ unit 3l, FIFO ½ unit 3m, data path arbiter unit 3n, crossbar unit 3o, multiplication unit 3p, integer unit 3q, and load store unit 3r. (E)DPE 3 is operatively connected with configuration bus 5.2" by means of configuration register 3s. Units 3a through 3r are mutually interconnected as indicated by corresponding lines in FIG. 6. Units 3d, e, f, r constitute a distributed synchronization unit of DPE 3. In other word: the synchronization unit 3d, e, f, r of DPE 3 need not be realized in the form of a self-contained single unit.

Decode

Incoming Operation Streams

The Data Processing Element (DPE) 3 will be fed by different streams of information, described by the StreamCount parameter. They can be distinguished in two classes of streams, the Non-Stalling Operation Stream (NSOS) and the Stalling Operation Streams (SOS), as mentioned previously. While it has to be ensured, that every valid data packet of the NSOS will be consumed by the DPE 3 upon its availability, the take-over of packets of the SOS can happen delayed.

NSOS—Non-Stalling Operation Stream:

Dependent on the Exception Bit of one packet of the NSOS packet stream, the remaining bits of the packet can be interpreted in two different ways.

In case the Exception Bit is not set, the NSOS will contain the following information:
    Valid (Bit)
    Exception (Bit)—contains information on NSOS exception
    MC (MCBits)—Modulus Cycle
    EDst[/ESlotCount]/DDst[/DSlotCount]—event and data destination registers
        LoNo (?RegNoBits)—logical register number (0=not used)
    EReFree[/ESlotCount]/DReFree[/DSlotCount]—event and data registers that have to be given free
        Used (Bit)
        ReNo (?RegNoBits)—Rename register number Here, the NSOS contains two logical information streams. The first one contains the initialization data for the Retire Reorder Buffer unit (RROB) 3g. The second one contains the rename register number that has been invalidated by the Rename Read Arbiter unit (RRA) 3k, to be reused/reassigned later on. For that reason it has to be ensured that the NSOS as fast (or faster, but not slower) as the SOS as otherwise Write-after-Write hazards could be generated.

For the other, when the Exception Bit is set, the NSOS will contain the following information:
    Valid (Bit)
    Exception (Bit)—Comprises NSOS Data (=1)
    StartMC (MCBits)
    EndMC (MCBits)

Here, the occurrence of an exception is communicated to the DPE 3. In to communicate the range of operations that have to be discarded, the MC related to the first (StartMC) and the last (EndMC) operation in the invalid range are contained in the stream. All operations in that invalid range [StartMC, EndMC] are affected by the exception and hence can be discarded. In case that operations in that range already have been processed by the DPE 3 or if operations of the invalid are going to be processed, the Retire unit 3h will take care that the register written in the range of the invalid MC will not be transferred from the Rename Register File 3i to the Logical Register File 3j.

SOS[/StreamCount]—Stalling Operation Stream:
    MC—Modulus Cycle
    Opcode
    ?Src[/Instr?SrcCount]—Source register (Data, Event)
        Type (2 Bits)—Register type (0=Logical, 1=Immediate, 2=Rename)
        No—Register number
    ?Dst[/Instr?DstCount]—Destination Register (Data, Event)
        XEDPENo—DPE number
        ReNo—Rename Register number
        Slot—Position in Reorder Buffer
    ?Imm (?BitWidth)—Data, Event immediate Each of the source registers either can address a Logical Register (Type==0), a Rename Regiser (Type==2) or an immediate (Type==1). XEDPENo addresses the destination DPE in the group of connected DPEs that realize a processor mode instance.

Decode Unit

The Decode Unit 3*l* decodes StreamCount (see section design parameters) operation streams from the Context Memory 3*a* or Rename Unit 5.3. Based on the contents of the Configuration Register 3*s* it controls the DPE Unit 3. In array mode it must store and send an array mode instruction pointer to the Context Memory Unit 3*a* to fetch instruction from the Context Memory 3*a*.

The Decode Unit 3*l* will realize two major tasks: It checks whether an operation can be executed (conflicting situations: resource conflicts, exceptions). It triggers the execution of the operation by generating the necessary control signals for the following stages.

Decode-Stall Check

Logical Register File

The read ports of the Logical Register Files 3*j* can be accessed by all data streams. In case that more read access occur than physical read ports are available, one of the data streams has to be stalled.

Rename Register Files

The Decode Units 3*l* and the Complete Reorder Buffer 3*c* share the read ports, which could lead to a stall. To evaluate whether sufficient read ports are available can be evaluated by requesting ports from the Rename Read Arbiter unit 3*k*.

The Rename Register file 3*i* must contain valid information in case that no data forwarding can be applied.

Execution Stage

Register File Read Access Limitations

The Logical Register File 3*j* can be accessed directly. Reading from the Rename Register File 3*i* instead has to be done through the Rename Read Arbiter unit 3*k*.

Rename Read Arbiter

The Decode Units 3*l* forward all the Rename Register numbers that have to be read to the Rename Read Arbiter unit 3*k*. In case a read request can be granted (free read port and register contains valid data), the Rename Read Arbiter unit 3*k* acknowledges the according request. Besides, the Rename Read Arbiter unit 3*k* triggers reading from the register by selecting one of the available read ports. In addition to the acknowledge, also the read port will be delivered back. This is necessary, as the Crossbar unit 3*o* has to be able to correctly assign the read register data values to the operating units of the ALU paths later on.

Write Back Sync

The Write Back Sync Unit 3*e* contains registers for all ALU paths. Along with a result computed in the ALU paths, the according destination Rename Register number will be saved in a register of the Write Back Sync Unit 3*e*. For fast data forwarding, the Decode Units 3*l* can evaluate which results are available in the Write Back Sync Unit 3*e*. Upon a match, the results can be bypassed to the Crossbar unit 3*o*. In addition, the Decode Units 3*l* inform the Write Back Sync Unit 3*e* which ALU paths are used for the next execution. This information can be used by the Write Back Sync Unit 3*e* for arbitrating which of the registers have to be written to the Rename Register File 3*i* with a higher priority to avoid pipeline stalls.

Crossbar

The Decode Units 3*l* forward control signals for the Crossbar unit 3*o*, the ALU paths and the Write Back Sync Unit 3*e* to the Crossbar unit 3*o*. Optionally, immediate values contained in the SOS will be delivered to the Crossbar unit 3*o*. All these information are buffered in the Crossbar unit 3*o* to be forwarded to the corresponding units in the next stage.

Details of the control signals:
  Crossbar: selection source operands (forwarding/bypass from Write Back Unit, Logical Register File, Rename Register File, Immediate)
  ALU Paths: Control signals resulting from the opcode
  Write Back:
    Dst.ReNo—Rename Register number
    Dst.XEDPENo—number of destination DPE required for IEM
    Dst.Slot—Reorder Buffer Slot number
  Data Path Arbiter (DPA)
    The DPA unit 3*n* arbitrates the Data-Path units 3*p*, 3*q*, 3*r* to the operations streams decoded by the Decode Unit 3*l*.
  Logical Register Files (LRFs)
    There are two Logical Register File 3*j* types, one for data values and one for event values. The consistency of the values contained in these register files is guaranteed, as only results of save instructions are written in-order from the Rename Register Files 3*i*. Resource conflicts on these registers files cannot occur as only the Deocode Units 3*l* can access the register files for reading. Writing to the Logical Register Files 3*j* is arbitrated by the Rename Read Arbiter 3*k*, triggered by the Retire Unit 3*h*.
  Rename Register Files (RRFs)
    Similar to the LRFs 3*j*, there are also two types of Rename Register Files 3*i*, one for data values and one for event values. The register files contain the unsafe, renamed results. Each register can either be in "Empty" or "Valid" state which is indicated by the Valid-Flag.
    Empty: the register does not contain a valid data, i.e. after reset all registers of the Rename Register Files are in this status
    Valid: the register contains valid date and can be read
  Rename Read Arbiter (RRA)
    There are also two types of Rename Read Arbiter units 3*k*, one for data and one for event. The Rename Read Arbiter unit 3*k* has to fulfill four main tasks:
    1. Arbitration of read ports of the Rename Register Files 3*i* for access by the Decode Units 3*l* and the Retire Unit 3*h*.
    2. The Decode Units 3*l* have a higher priority for getting read request granted than the Retire Unit 3*h*. That means that the Retire Unit 3*h* only gets the remaining read ports assigned, after the Decode Units 3*l* have been served. However, it has to be taken care that the order of write-back actions have strictly to be maintained.
    3. Handling of the Valid-Flags of the Rename Register File 3*i*. The flag of Rename Registers written by the Write Back Sync Unit 3*e* has to be set to "Valid", while the flag of Rename Register File 3*i* that have be cleared according the NSOS has to be set to "Empty".
    4. The Rename Read Arbiter 3*k* gets informed by the Retire Unit 3*h* about the write-back actions that have to be performed. The Rename Read Arbiter 3*k* then has to control the transfer of registers values from the Rename Register Files 3*i* to the Logical Register Files 3*j*.
  Ports
  Read?RRF [/?ReadPorts]—Read port of the Rename Register Files
    => Enable (Bit)
    => RegNo (?RegNoBits)
  Write?LRF[/?ReadPorts]—Write port of the Logical Register Files
    => Enable (Bit)
    => RegNo (?RegNoBits)
  WB?WritePorts[/?WritePorts]—Write Back Write Ports
    <= Enable (Bit)
    <= RegNo (?RegNoBits)

DecodeStream[/StreamCount]
?ReadReq[/Instr?SrcCount]
=> Enable (Bit)
=> ReNo (?RegNoBits)
<= PortNo (Implizit möglich)
<= ?Grant (Bit)
Retire?Req[MIN(/?ReadPorts, /?WritePorts)]—Retire Requests of the Retire Unit
=> Enable (Bit)
=> LoNo (?RegNoBits)—Logical register number
=> ReNo (?RegNoBits)—Rename register number
<= Grant (Bit)

Crossbar

Based on the control signals of the Decode Units 3l, the Crossbar unit 3o has to select the operands from the different sources (forwarding/bypass from Write Back Sync Unit 3e, Logical Register File 3j, Rename Register File 3i, Immediate) and has to assign them to the ALU-Paths (3p, 3q, 3r). In case that the targeted synthesis frequency should not be reached, an additional register bank could be added to the outputs of the Crossbar unit 3o, adding an additional pipeline stage Ports
?Input—data and event inputs
=> ?LoReg[/?ReadPorts] (?BitWidth)
=> ?ReReg[/?ReadPorts] (?BitWidth)
=> ?Fwd[/?FwdPorts] (?BitWidth)
=> ?Imm[/StreamCount] (?BitWidth)
InstrIn[/StreamCount]—control signals from Decoder Units
=> DataPathNo—output port (ALU path) according to the operation given by the SOS
=> ?SrcPort[/?Instr?SrcCount]—data and event input port numbers per operand. Per operand any of the inputs can be chosen. In addition there is a special case for generating a "0".
=> CtrlSignals—control signal of the operation
<= Stall (Bit)
InstrOut[/AluPath]—control signals that go to the ALU path
<= ?Src[/?Instr?SrcCount] (?BitWidth)—data and event source operands
=> Stall (Bit)
<= CtrlSignals
MC
ALUCtrl
?Dst[/Instr?DstCount]—data and event source destination register
XEDPENo—DPE number
ReNo—Rename Register number
StreamNo—Stream number
Slot—Slot number in the Retire Reorder Buffer related to the MC ALU Paths In the ALU-paths (3p, 3q, 3r) the logical, arithmetical and DSP style computations are performed. Less complex computations will be executed within a single cycle while more complex operations will require multi-cycle execution. In some situations, a stall situation could occur where the Crossbar unit 3o is not allowed to trigger the next operation to be executed on the ALU path (3p, 3q, 3r). These are especially situations where the generated results cannot be taken over in the ALU path (3p, 3q, 3r) related register of the Write Back Sync Unit 3e due to the fact the register is still in use. The Decode Units 3l and the Crossbar unit 3o have to be aware of such situations and have to handle them correctly.

Ports
InstrIn—all the signals coming from the Crossbar
InstrOut—control signals to the units of the ALU paths
<= MC
<= StreamNo—Stream number
?Dst[/?Instr?DstCount]—results, data and event destination register
<= Valid (Bit)—information on the validity of the results
<= Data (?BitWidth)—data or event selector
<= XEDPENo (2 Bit)—DPE number
<= ReNo (?RegNoBits)—Rename Register number
<= Slot—Slot number in the Retire Reorder Buffer related to the MC
=> Stall (Bit)
CDst—Complete information
<= Valid (Bit)—information on the validity of data on the output
<= ExcCycles (MCBits)—0 indicates not used
=> Stall (Bit)
XDst—Exception information
Signals from DDst
<= Exception (4 Bits)—Exception number The results generated by an ALU path can be of type data, event, complete and exception. The individual Valid bits tell whether the particular are available. In the table given next, the possible combinations of the Valid bits are given:

| | CDst.Valid | XDst.Valid | DDst[*].Valid | EDst[*].Valid |
|---|---|---|---|---|
| Idle | 0 | 0 | 0 | 0 |
| Exception | 0 | 1 | 0 | 0 |
| Successful exec. | 1 | 0 | RegNo != 0 | RegNo != 0 |

An ALU path has to stall as soon as any of the results cannot be taken over into the register of the Write Back Sync Unit 3e.

Load Store

The Load Store unit 3r is an ALU Path unit such as 3p, 3q, 3r and executes all load and store operations accessing the main memory 8. Based on the contents of the configuration register 3s the Load Store unit 3r is adapted to synchronize all memory accesses between all DPEs such as 3 involved in the same processor instance. The memory accesses must be synchronized to achieve cache coherency between all Data Cache units 3a of all DPEs such as 3 involved in the same processor instance.

Each memory address within one processor instance is assigned to one Data Cache unit 3a. The assignment is based on the lower bits of the memory address and on the contents of the configuration register 3s. If the memory address is assigned to the local Data Cache unit 3a with DPE 3 the memory access is transferred to local Memory Order Buffer 3b. Otherwise, the memory access is transferred to the Memory Order Buffer 3b of the assigned DPE such as 3 via Data Link Structure 4.

Memory Order Buffer (MOB)

The MOB unit 3b is required to realize precise interrupts. Store operation of the Load Store unit 3r may be only validated and passes to the Data Cache unit 3a if it can be guaranteed that no exception occurred in any operation of any instruction before or parallel to the instruction comprising the store operation. Therefore, all store operations are stored in a store queue inside the MOB unit 3b. The Reconfigurable Sync Unit 3f transfers the number of finished MCs to the MOB unit 3b. All store operations older than the finished MC are popped from the store queue and passes to the Data Cache unit 3a or discarded in case of an exception.

All load operations are checked for overlapping of the address with the store queue. In case of a stored store operation with the same address the data of the store address is used and returned to the Load Store Unit 3r if the MC of the load operation is newer than the MC of the store operation. Otherwise, the load operation is directly passes to the Data Cache Unit 3a.

Data Cache/Context Memory (DCCM)

Based on the contents of the configuration register 3s the DCCM unit 3a is adapted for temporary constituting a data cache or context memory. As data cache the DCCM unit 3a caches the memory accesses from the MOB unit 3b. As context memory the memory accesses are passes through the DCCM unit 3a directly to the memory bus 8'. As context memory the DCCM unit 3a acts as instruction/operation memory. In this case the Decode Unit 3l controls which instructions should be fetched out of the context memory and to the Decode unit 3l via the FIFO unit 3m.

Write Back Sync (WB)

The Write Back Sync Unit 3e has to handle the transfer of results stored in the local registers (not explicitly depicted) to the Rename Register Files 3i in case that the destination DPE matches the local DPE 3 or by transferring the result to the destination DPE based on an Inter (E)DPE Move (IEM). The results of the register files can thereby originate from the ALU path and incoming IEM. The results can be of type Data, Event, Complete and Exception.

The table next shows the difference of the Write Back Sync internal units related to the above given types:

|  | Event (EWB)/Daten (DWB) | Complete (CWB) | Exception (ExWB) |
| --- | --- | --- | --- |
| ALUInPorts | Instr?DstCount | 1 | 1 |
| IEMPorts | IEM?Channels | 0 | 0 |
| OutPorts | ?WritePorts | CWritePorts | 1 |
| Target | RRF RRA RROB | CROB | CFB |
| ForwardPorts | ?FwdPorts | 0 | 0 |
| Data | MC (MCBits) Data (?BitWidth) XEDPENo (2 Bit) ReNo (?RegNoBits) Slot | MC (MCBits) StreamNo ExcCycles (MCBits) | MC (MCBits) Data (DBitWidth) XEDPENo (2 Bit) ReNo (DRegNoBits) Slot StreamNo Exception (4 Bits) |

The register for the IEM and ALU path will contain the following information

WBReg[ ]

Valid (Bit)—information on the validity of the result

Data—see table above

Thereby it could happen that more registers are ready to be written back, resource constraints (i.e. free write ports on the Rename Register Files 3i) however limit this operation. The write back of each register inside the Write Back Sync Unit 3e has thus to be arbitrated individually. Different priority schemes of arbitration exist.

Ports:

ALUPathIn[/AluPath][/ALUInPorts]  IEMIn[/3][/IEMPorts]

=> Valid (Bit)

<= Stall (Bit)

=> Data—see table above

IEMOut[/3][/IEMPorts]

Same signals as found by IEM?In

Out[/OutPorts]

<= Valid (Bit)

=> Stall (Bit)

=> Data—see table above

Forward[/ForwardPorts]

=> Data—see table above

Decode see Decode Unit 3l

The stall signal on the input is generated as soon as a new value cannot be taken over into the register. This will happen when a register containing valid data cannot be written back.

A stall on the outputs can only occur in relation to the Control Flow Bus unit 5.2'.

Control Flow Bus (CFB)

The Control Flow Bus 5.2' (cf. FIGS. 3, 4 and 6) is the interface between the DPEs 3 and the Instruction Pre-Decode and Control Flow Units 5.2. This bus is accessed for at least the following situations:

after an exception has occurred, when the DPE 3 has to fetch the value of the Instruction Pointer, flow control handling.

The Control Flow Bus interface resides inside the Write Back Sync Unit 3e.

Example how the Control Flow Bus is used for handling a conditional jump:

Calculation of the target address of the jump. Due to the fact the Branch Prediction unit 5.2c (cf. FIG. 4) could have mispredicted the jump, or even for the absence of the branch prediction unit, an exception will always be generated.

The Exception information will be generated on transferred to the Control Flow processor resource unit 5.2 via the Control Flow Bus.

Upon the reception of the exception, the Control Flow processor resource unit 5.2 has to evaluate whether the branch was predicted correctly or not. In the latter case the MC range that has to be invalidated has to be determined. The result will be send back to the DPE 3 via the Control Flow Bus.

Upon the reception of the result in the Complete Write Back Sync Unit 3e, the unit will evaluate whether MCs have to be invalidated as well as the MC range.

The Complete Write Back Sync Unit 3e will then configure the Complete Reorder Buffer unit 3c accordingly, so that the connected DPEs of the processor mode instance will get informed about the details of the exception via the sync protocol.

Retire Reorder Buffer (RROB)

The RROB unit 3g is a ring buffer that contains for each MC the write back state of the event and data rename registers 3i. Additionally, the rename and logical register number for retirement are stored. The RROB 3g has per MC a predefined number of data and event slots that restrict the maximum number of write accesses to data and event registers per MC. Each register write access has a unique slot number within on MC.

The RROB 3g contains the following entries:

RROB[/2^MCBits]

?Slots[/?SlotCount]—data and event slots

Done (bit)—Result is calculated and stored within the renaming register

LoNo (?RegNoBits)—Logical register number, if LoNo!=0 the result is required and is needed to retire the MC.

ReNo (?RegNoBits)—Rename register number

The contents of the RROB $3g$ is written by two different data sources:
1. The NSOS initializes the MC within RROB $3g$. For initialization, the done bits are reset and the LoNo values are set to the values from NSOS.
2. Write Back Sync unit $3e$ passes the RROB $3g$ the Slot and ReNo for each write access performed on the RRFs $3i$. The corresponding done bit is set to 1.

The RROB $3g$ is used by the Retire unit $3h$ to transfer the temporary values within the rename registers $3i$ into the logical registers $3j$. Therefore, Retire unit $3h$ passes a read pointer to RROB $3g$ and gets as results two successive RROB entries starting from the read pointer.

?Update[/?WritePorts]—Update done bits and ReNo values from Write Back
=> Used (bit)—Update port used
=> MC (MCBits)
=> SlotNo—Slot number
=> ReNo (?RegNoBits)—Rename register number Retire
=> MC—Read address
<= Data[/2]—Two successive entries for Retire
?Slots[/?SlotCount]

NSOS
=> Valid (bit)
=> MC (MCBits)
=> ?LoNo[/?SlotCount]

Complete Reorder Buffer (CROB)

The CROB unit $3c$ is a ring buffer that stores for each MC the execution state of the local operations. The execution state comprises if the operation has been completed (or the execution has been initiated and no exception will be thrown) and if an exception has been thrown. The CROB unit $3c$ has per stream and MC one complete bit. It consists of the following entries:

CROB[/2^MCBits]
ExcCycles (MCBits bits)—The value is >0 if an exception has been thrown. In this case the number of cycles is given how long the exception should be valid.
Stream[/StreamCount]—Operation Streams
Complete (bit)—The operation has been executed The CROB unit $3c$ receives its contents from different sources:
1. The NSOS initializes the MC. Therefore ExcCycles will be 0 and the Complete-bits are resettet.
2. The Write Back Sync Unit $3e$ transfers each finalized operation. Along the Complete-bits are set.
3. The Decode Units $3l$ provide additional information for setting the Complete-bit. That is the case either if a NOP occurs or if the SOS FIFO gets (partly) flushed when an exception occurs.
4. In case of an exception, the Write Back Sync Unit $3e$ puts the exception details on the Control Flow Bus $5.2'$. As a response, it receives a value which is written to ExcCycles. In addition the Complete-bit will be set.

The CROB $3c$ is read by the Complete Check Unit $3d$. The Complete Check Unit $3d$ thereby transmits a read pointer whereon the CROB $3c$ provides the according two consecutive entries. For optimization purpose a constraint could be established, which would force to align the read pointer to a multiple of two.

EWB[/CWritePorts]
<= Used (Bit)—Update Port used
<= MC (MCBits)
<= ExcCycles (MCBits)
<= Stream No—number of the operation stream Decode[/StreamCount]
=> Valid (Bit)
=> StartMC (MCBits)—start MC number
=> EndMC (MCBits)—end MC number CompleteCheck
=> ReadMC—Read Address
<= Data[/2]
ExcCycles (MCBits)
Stream[/StreamCount]
Complete (Bit)

Complete Check (CC)

CC unit $3d$ checks the completing of the operations in the original sequence specified in the instruction stream. For each MC is it successively checked if the MC is completed. A MC is completed if all operation of it has been calculated or will be calculated without throwing an exception. This is the case if all complete bits are set for one MC. Therefore, the CC unit $3d$ has two read ports to the CROB $3c$. Internally, the MC to be checked next is stored. By utilizing the both read ports two completed MCs could be detected per cycles. The number of completed MCs per cycle and if an exception has been thrown is transferred to the neighbouring DPEs using the Sync Protocol.

CC $3d$ could be in normal or exception mode. A toggle of the exception mode must be indicated with the Sync Protocol at the correct cycle. CC $3d$ gets from CROB $3c$ the ExcCycles values transferred. If CC $3d$ is not in exception mode, the exception mode is always activated for ExcCycles cycles (in case of ExcCycles=0 it is activated for 0 cycles i.e. no activation is performed) if one MC is completed. In exception mode only the complete bits are checked and the ExcCycles values are ignored.

CROB—See CROB $3c$
=> SP—Sync Protocol

Reconfigurable Sync (RS)

In general, Reconfigurable Sync unit $3f$ fulfils the tasks of synchronizing several Sync Protocol streams. Based on the contents of the configuration register $3s$ the RS unit $3f$ is adapted to synchronize all Sync Protocol streams from DPE units such as 3 involved in the same processor instance. As output a synchronized Sync Protocol is generated.

In each DPE 3 a RS unit $3f$ is available that synchronizes four data streams. One data stream results from the own DPE 3 while the remaining three data streams are transferred from neighbouring DPEs. The streams from the three neighbours can be deactivated or activated using three configuration bits in Configuration Register $3s$.

The output is calculated from the minimum of the MCs and by oring the exception state. Internally, the RS unit $3f$ can be realized by using Sync Destaller units (not explicitly depicted).

=> SPIn[/4]—Four Sync Protocol input streams
<= SPOut—Synchronized Sync Protocol output stream Retire The Retire unit $3h$ makes the results stored in the temporary Renaming Register File $3i$ valid. Therefore, the results are copied in the sequence of the instruction stream from the Renaming Register File $3i$ into the Logical Register File $3j$. The number of finished MCs per cycle is passed to the Renaming unit 5.3 (cf. FIG. 5). To retire one MC, all operations of this MC of all connected DPEs 3 must be successfully completed and all results must be available in the Renaming Register File 3*i* or respectively the register numbers available in RROB 3*g*. Retire 3*h* receives the Sync Protocol from Reconfigurable Sync 3*f*. In case of an exception the contents of the RROB 3*g* is ignored and the MC is instantly retired. Otherwise, the LoNo values and done bits within the RROB 3*g* are evaluated and the rename as well as the logical register number are passed to the RRA 3*k*.

The Retire unit 3*h* makes use of the DS. It can be split into Event and Data Retire that could operate independently. In this case the Delta MC output signal must be combined from both units.

=> SP—Sync Protocol
RROB—See RROB
RRA—See RRA
<= DeltaMC (2 bits)—DeltaMC is passed to Renaming for freeing rename registers.
Configuration Register The Configuration Register 3*s* stores the configuration of the DPE unit 3. It can be accessed via Configuration Bus 5.2".

Sync-Protocol

The Sync Protocol is a simple protocol that is used to synchronize the MC and exceptions between DPEs 3. Furthermore it is used between DPEs 3 and Processor Resource units 5 (cf. FIGS. 1 and 2). The MC is transmitted differentially. The protocol is unidirectional and non-stalling. In every cycle 2 bits are transferred with the following encoding:

| 00 | No modification |
|----|-----------------|
| 01 | Increase MC by 1 |
| 10 | Increase MC by 2 |
| 11 | Toggle exception state and increase MC by one |

Sync-Destaller (SD)

The Sync Protocol is non-stalling. For units that are receiving it but are not able to process it instantly the Sync Destaller can be used.

=> SP (2 bits)—Sync Protocol input
<= MC (MCBits)—Current MC
<= Valid[2] (2 Bit)—Valid bit of current and succeeding MC
<= Exc[2] (2 Bit)—Exception state of current and succeeding MC
=> Inc[2] (2 Bit)—Increment current MC?

The SD outputs always the number of the current MC. In addition it outputs the information if the current MC and its succeeding MC is valid i.e. if both are valid a "11" is set. Exc indicates the exception state of the both MCs if these MCs are valid. Inc controls how many MCs should be popped. By feeding back Valid to Inc all incoming data are output instantly.

Abbreviations
BP . . . Branch Prediction
CC . . . Complete Check
CROB . . . Complete Reorder Buffer
CWB . . . Complete Write Back
CFB . . . Control Flow Bus
DCCM . . . Data Cache/Context Memory
DD . . . Destination Decode Sync
DE . . . Destination Encode Sync
DPA . . . Data Path Arbiter
DPE . . . Data Processing Element
DWB . . . Data Write Back
EDPE . . . Embedded Data Processing Element
EH . . . Exception Handler
EWB . . . Event Write Back
ExWB . . . Exception Write Back
IP . . . Instruction Pointer
IPF . . . IP Filter
IPH . . . IP History
ISA . . . Instruction Set Architecture
LRF . . . Logical Register File
MC . . . Modulus Cycle
MCF . . . Mapping Clear Fifo
MOB . . . Memory Order Buffer
NSOS . . . Non-Stalling Instruction Stream
RFF . . . Rename Free Fifo
RRA . . . Rename Register Allocation
RRA . . . Rename Read Arbiter
RRF . . . Rename Register Files
RROB . . . Retire Reorder Buffer
RS . . . Reconfigurable Sync
SD . . . Sync-Destaller
SOS . . . Stalling Operation Stream
WB . . . Write Back Appended FIGS. 7 and 8 show, in an abstract fashion, the essential operation of an ISA-type 4-issue VLIW processor and of an ISA-type RISC processor, respectively, as realized by means of a processor architecture in accordance with the present invention.

Figure 7:
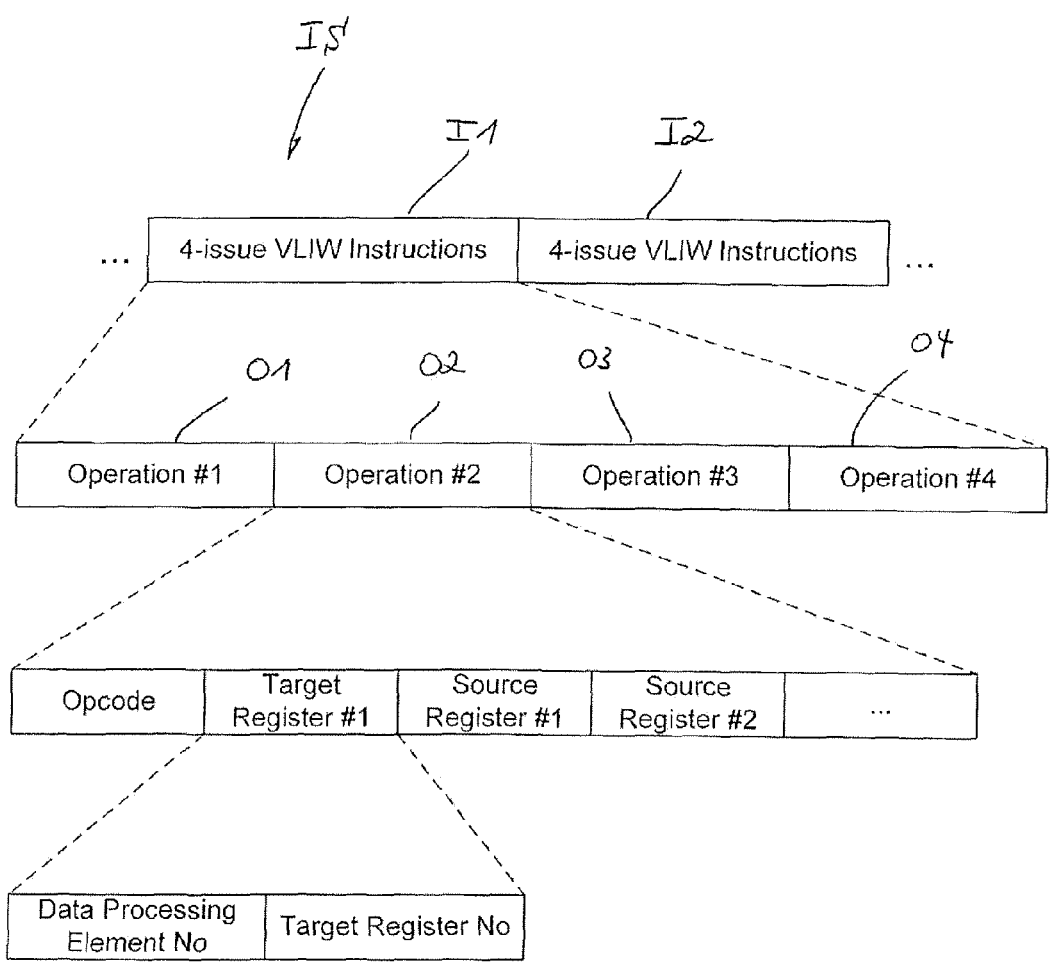
FIG. 7 shows, in an abstract fashion, the essential operation of an ISA-type 4-issue VLIW processor as realized by means of a processor architecture in accordance with the present invention.
Figure 8:
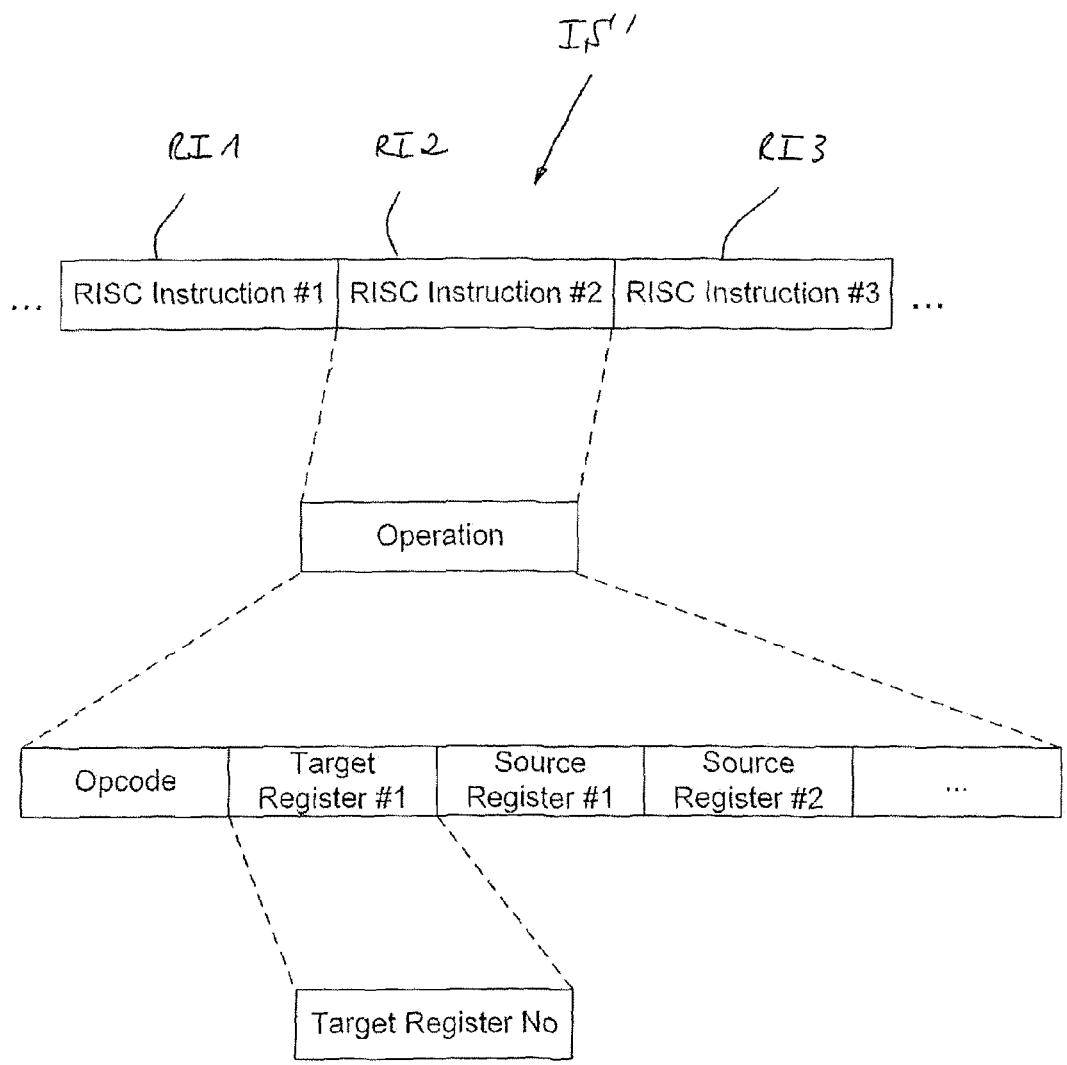
FIG. 8 shows, in an abstract fashion, the essential operation of an ISA-type RISC processor as realized by means of a processor architecture in accordance with the present invention.

FIG. 7 shows a 4-issue VLIW Instruction Stream IS. Instruction stream IS consists of sequence of instructions I1, I2, . . . executed one after another. Each 4-issue VLIW Instruction I1, I2 within the 4-issue VLIW Instruction Stream comprises four operations O1-O4 that are independent from each other and thus can be executed in parallel.

Each Operation O1-O4 comprises at least one Opcode and optionally one Target Register Identifier and two Source Register Identifiers, which are named as such in FIG. 7. The Opcode identifies the type of operation to be performed. The Target Register Identifier specifies the register the result should be stored in. The Source Register Identifiers specify the registers the contents of which are used to calculate the result.

In 4-issue VLIW processor mode, each Operation O1-O4 is always executed by one dedicated configured Data Processing Element (DPE) 3, e.g., Operation #1 O1 always on Data Processing Element #1, Operation #2 O2 always on Data Processing Element #2, etc. Each Data Processing Element comprises a register file 3*j*. The source operands of one operation are loaded from the register file 3*j* or 3*i* of the Data Processing Element the operation is executed on. The result is either stored in the local register file 3*j* or the register file 3*j* of any Data Processing Element 3 parts of the processor mode instance (cf. description of FIG. 6 farther up). The target register file 3*j* is identified by the Data Processing Element No (number). If the number identifies a non-local register file 3*j*, the synchronisation unit 3*e* of the present DPE, as described farther up, will be used to transfer the result via the data link structure 4 to the corresponding Data Processing Element 3.

FIG. 8 shows a RISC Instruction stream IS'. The instruction stream IS' consists of a sequence of RISC Instructions RI1, RI2, . . . executed one after another. Each RISC Instruction RI1, RI2, . . . comprises exactly one operation, which is named as such in FIG. 8.

In contrast to the 4-issue VLIW operations I1, I2, . . . depicted in FIG. 7, the RISC operations RI1, RI2, . . . do not contain the data processing element number.

As a particular example, execution of one 4-issue VLIW instruction I1 (cf. FIG. 7) will be explained with reference to the processor architecture as shown in FIG. 3. The 4-issue VLIW instruction contains four operations (cf. FIG. 7) whereby operations #1-#3 (O1-O3) store the result on the local register file 3*j* and the operation #4 O4 write the result into the register file 3*j* of DPE #3 (3.3).

The Control Unit 7 establishes a 4-issue VLIW processor instance by configuring the necessary units utilizing the Configuration Bus 5.2" (FIGS. 4-6). The Configuration Registers 3*s*, 5.3*j*, 5.2*i* in EDPEs #1-#4 (3.1-3.4), Renaming processor resource units #1-#4 (5.31-5.34), Pre-Decode+Control Flow processor resource units #1-#4 (5.21-5.24), Instruction Fetch unit 5.1*b*, and Split unit 5.1*a* are written.

In 4-issue VLIW mode, only the Control Flow processor resource unit #1 (5.21) is active. Control Flow processor resource units #2-#4 (5.22-5.24) perform only pre-decoding.

Execution is Started in Control Flow processor resource unit #1 (5.21) by passing the instruction pointer to Instruction Fetch unit 5.1*b*. Instruction Fetch unit 5.1*b* fetches the cache line containing the instruction identified by the instruction pointer. The Cache Line is transferred to Split unit 5.1*a*. A 4-issue VLIW instruction comprises four operations (cf. FIG. 7). Split unit 5.1*a* first extracts the instruction word out of the cache line and then splits up said four operations from the instruction word and passes them to Pre-Decode+Control Flow processor resource units #1-#4 (5.21-5.24). Pre-Decode processor resource units #1-#4 (5.21-5.24) decode the four operations in parallel and pass the decoded instruction to Renaming processor resource units #1-#4 (5.31-5.34). Renaming processor resource units #1-#4 (5.31-5.34) perform a register renaming on the four operations to resolve naming dependencies between registers. As given by the scenario, operation #4 will write its result to the register of DPE #3 (3.3), operation #4 must be renamed by renaming processor resource unit #3 (5.33). The distributed synchronization unit 5.3*f, i, h* comprised in renaming processor resource unit 5.3 is used to synchronize register renaming with Renaming units 5.31-5.34. Destination Decode Sync 5.3*f* of Renaming processor resource units #3 and #4 (5.33, 5.34) are used to transfer the target register number of operation #4 from renaming processor resource unit #4 (5.34) to renaming processor resource unit #3 (5.33). Renaming processor resource unit #3 (5.33) renames the target register number of operation #4 and transfers it back to renaming processor resource unit #4 by utilizing the Destination Encode Sync units (5.3*f*) of Renaming processor resource units #3 and #4 (5.33, 5.34). The renamed operations are transferred to the data processing elements 3.1-3.4. Within the data processing elements 3.1-3.4 the renamed operations are executed and the results are generated.

The generated results of operations #1-#3 are temporarily stored in the local renaming register file 3*i* of the corresponding data processing element 3.1-3.3. Within DPE #4 (3.4), which executed operation #4, the write back synchronization unit 3*e* is used to transfer the result via the data link structure 4 from DPE #4 (3.4) to DPE #3 (3.3). Within DPE #3 (3.3) the result is received by the synchronization unit 3*e* and temporarily stored in the local rename register file 3*i*.

After execution of the operations within DPEs 3.1-3.4, each DPE (3.1-3.4) signals to all other DPEs (3.1-3.4), using the synchronization units 3*d* and data link structure 4, the exception state of their executed operation (whether an exception occurred during execution of their operation or not).

Each synchronization unit 3*f* of DPEs 3.1-3.4 receives the exception state of all other DPEs 3.1-3.4. Synchronization unit 3*f* combines the exception states of all DPEs 3.1-3.4 and signals the combined state to Retire unit 3*h*. An exception is signalled within the combined exception state if any exception state of DPE 3.1-3.4 indicates an exception. Retire unit 3*h* of DPEs 3.1-3.4 initiates the copy process of the results of Operation #1-#4 from the temporary rename register file 3*i* to the permanent logical register file 3*j* if no combined exception is signalled by synchronization unit 3*f*. Otherwise the results of Operation #1-#4 are discarded in each DPE 3.1-3.4.

As another particular example, execution of two RISC instructions each executed by one RISC instance within the processor architecture will be explained with reference to the processor architecture as shown in FIG. 3. Each RISC instruction contains one operation whereby operation #1 refers to operation of RISC instance #1 and operation #2 refers to operation of RISC instance #2.

The Control Unit 7 establishes two RISC processor instances by configuring the necessary units utilizing the Configuration Bus 5.2". The Configuration Registers 3*s*, 5.3*j*, 5.2*i* in EDPEs #1, #2 (3.1, 3.2), Renaming processor resource units #1, #2 (5.31, 5.32), Pre-Decode+Control Flow processor resource units #1, #2 (5.21, 5.22), Instruction Fetch unit 5.1*b*, and Split unit 5.1*a* are written. In contrast to the previous example, both Control Flow processor resource units #1, #2 (5.21, 5.22) are active.

Execution is started in Control Flow processor resource units #1 and #2 (5.21, 5.22) by passing two instruction pointers to Instruction Fetch unit 5.1*b*. Instruction Fetch unit 5.1*b* fetches consecutively the two cache lines containing the two RISC instructions identified by the two instruction pointers. The two cache lines are consecutively transferred to Split unit 5.1*a*. Split unit 5.1*a* extracts operation #1 from cache line #1 and operation #2 from cache line #2 and passes both operations to Pre-Decode+Control Flow processor resource units #1, #2 (5.21, 5.22). Pre-Decode processor resource units #1, #2 (5.21, 5.22) decode the two RISC operations of independent instruction sequences in parallel. Pre-Decode unit #1 (5.21) passes the decoded operations to corresponding Renaming processor resource units #1 (5.31). Pre-Decode unit #2 (5.22) passes the decoded operations to corresponding Renaming processor resource units #1 (5.32). No synchronization between the Pre-Decode and Control Flow units (5.21, 5.22) is done since synchronization unit 5.2*h* is adapted, based on the contents of the configuration register 5.2*i*, to operate independently. Renaming processor resource units #1, #2 (5.31, 5.32) perform a register renaming on the two operations to resolve naming dependencies between registers. No synchronization between the Renaming units (5.31, 5.32) is done since the synchronization units 5.3*i, h, f* are adapted, based on the contents of the configuration register 5.3*j*, to operate independently. The renamed operations are transferred to the data processing elements 3.1, 3.2. Within the data processing elements 3.1, 3.2 the renamed operations are executed and the results are generated. The generated results of operation #1, #2 are temporarily stored in the rename register files 3*i* of the corresponding data processing elements 3.1, 3.2.

Each Synchronization unit 3*f* is adapted by the contents of the configuration register 3*s* to work independently of other synchronization units. Therefore, each Synchronization unit 3*f* of DPEs 3.1, 3.2 gets only the local exception state of Operation #1 and #2, respectively, signalled by local Complete Check unit 3*d*.

Each Retire unit 3*h* of DPE 3.1, 3.2 initiates independently the copy process of the results of Operations #1 and #2, respectively, from the local temporary rename register file 3*i* to the local permanent logical register file 3*j* if no exception is signalled by local complete check unit 3*f*. Otherwise, the results of Operation #1 and #2, respectively, are discarded in corresponding DPE 3.1, 3.2.

The invention claimed is:

1. A processor architecture (1), comprising:
a first plurality of data processing elements (3; 3.1, 3.2, ... ), each data processing element of said first plurality of data processing elements comprising a respective synchronization unit (3e, 3f, 3r),
a data link structure (4) adapted for dynamically interconnecting a number of the data processing elements from said first plurality of data processing elements,
at least one configuration register (3s, 5.2i, 5.3j), and, at least one control unit (7) in operative connection with said configuration register for controlling a contents thereof,
wherein, based on the contents of said configuration register, said first plurality of data processing elements (3; 3.1, 3.2, ... ) is adapted for temporarily constituting at runtime at least one group (2) of one or more of said data processing elements from said first plurality of data processing elements dynamically via said data link structure, wherein said synchronization units are adapted for synchronizing data processing by individual ones of the data processing elements within said group of data processing elements.

2. The processor architecture (1) of claim 1, further comprising a plurality of processor resource units (5), comprising at least one of instruction fetch units (5.1b) or control flow units (5.2), for temporarily constituting at runtime, based on the contents of said configuration register (3s, 5.2i, 5.3j), at least one processor mode instance of ISA-type ($A_1$-$A_4$) from said group of data processing elements and from a number of said processor resource units, at least some of said processor resource units being associated with at least one of said configuration register (3s, 5.2i, 5.3j) or with said optional control unit (7).

3. The processor architecture (1) of claim 2, wherein said processor mode instance of ISA-type ($A_1$-$A_4$) is chosen from a group comprising at least RISC and n-issue VLIW processor modes, wherein n is a positive integer value, which is equal to or less than a positive integer value m, m being a maximum possible number of total issues of processor instances presently achievable by the processor architecture.

4. The processor architecture (1) of claim 3, wherein the processor is further adapted to create, via the contents of said configuration register (3s, 5.2i, 5.3j), a plurality of processor mode instances ($A_1$-$A_4$) in accordance with:

$$\sum_{i=1}^{N} W_i \leq m,$$

where i denotes a given processor mode instance, N denotes a total number of processor mode instances, and $W_i$ denotes an issue width of processor mode instance i.

5. The processor architecture (1) of claim 4, wherein a number of said processor resource units (5) are comprised in individual data processing elements (3; 3.1, 3.2, ... ) of said first plurality of data processing elements.

6. The processor architecture (1) of claim 5, wherein the processor is further adapted for reconfiguring an instruction format for at least one predetermined application thread for execution on said processor architecture, whereby at least one of the number of data processing elements (3; 3.1, 3.2, ... ) or an amount of processor resource units (5) required for creating processor mode instances ($A_1$-$A_4$) for execution of at least one of said application thread or an execution duration of said application thread are minimized.

7. The processor architecture (1) of claim 6, wherein the processor is further adapted to allocate at least some of the remaining data processing elements (3; 3.1, 3.2, ... ) or processor resource units (5), which are not required for execution of said application thread, for additional functionality, for creating additional processor mode instances ($A_1$-$A_4$).

8. The processor architecture (1) of claim 1, wherein the processor is further adapted for controlling synchronized data exchange between at least two of said data processing elements (3; 3.1, 3.2, ... ) via corresponding synchronization units (3e, 3f, 3r).

9. The processor architecture (1) of claim 1, wherein at least for pairs of data processing elements (3; 3.1, 3.2, ... ) the respective synchronization units (3e, 3f, 3r) are adapted for delaying operation execution in a first data processing element until data required for said operation execution have been transmitted from a second data processing element via said respective synchronization units.

10. The processor architecture (1) of claim 2, wherein the processor is further adapted for temporarily constituting at runtime, based on the contents of said configuration register (3s, 5.2i, 5.3j), at least one array mode processor instance ($A_5$-$A_8$), which does not require additional processor resource units (5), from said group (2) of data processing elements (3; 3.1, 3.2, ... ), and said array mode processor instance does not support interrupt driven code execution.

11. The processor architecture (1) of claim 10, further comprising in at least one of said data processing elements (3; 3.1, 3.2, ... ) at least one local memory (3a), wherein said local memory is adapted for storing data processing instructions at least for said array mode.

12. The processor architecture (1) of claim 1, wherein at least two of said data processing elements (3; 3.1, 3.2, ... ) are operatively connected with a respective instruction fetching unit (5.1b) for fetching instructions for execution by said data processing elements, and at least the respective synchronization units (3e, 3f, 3r) of said two data processing elements are devised for synchronizing subsequent instructions to be fetched by said instruction fetching units.

13. The processor architecture (1) of claim 1, wherein at least one of said data processing elements (3; 3.1, 3.2, ... ) is adapted for executing an instruction stream (IS, IS'), and for executing operations from said instruction stream out of their order in said instruction stream.

14. The processor architecture (1) of claim 1, wherein at least one of said data processing elements (3; 3.1, 3.2, ... ) is adapted for executing in parallel at least two operations from at least one instruction stream (IS).

15. The processor architecture (1) of claim 1, wherein at least two of said data processing elements (3; 3.1, 3.2, ... ) are adapted for executing instructions from different instruction sets.

* * * * *